US012367397B2

(12) United States Patent
Hoffman et al.

(10) Patent No.: US 12,367,397 B2
(45) Date of Patent: Jul. 22, 2025

(54) QUERY-BASED MOLECULE OPTIMIZATION AND APPLICATIONS TO FUNCTIONAL MOLECULE DISCOVERY

(71) Applicant: International Business Machines Corporation, Armonk, NY (US)

(72) Inventors: Samuel Chung Hoffman, New York, NY (US); Enara C Vijil, Westchester, NY (US); Pin-Yu Chen, White Plains, NY (US); Payel Das, Yorktown Heights, NY (US); Kahini Wadhawan, Delhi (IN)

(73) Assignee: International Business Machines Corporation, Armonk, NY (US)

( * ) Notice: Subject to any disclaimer, the term of this patent is extended or adjusted under 35 U.S.C. 154(b) by 895 days.

(21) Appl. No.: 17/016,640

(22) Filed: Sep. 10, 2020

(65) Prior Publication Data

US 2022/0076137 A1 Mar. 10, 2022

(51) Int. Cl.
*G06N 20/00* (2019.01)
*G06F 16/245* (2019.01)
*G06N 3/126* (2023.01)

(52) U.S. Cl.
CPC ........... *G06N 3/126* (2013.01); *G06F 16/245* (2019.01); *G06N 20/00* (2019.01)

(58) Field of Classification Search
USPC ......................................................... 706/12
See application file for complete search history.

(56) References Cited

U.S. PATENT DOCUMENTS 11,049,590 B1 * 6/2021 Lee .......................... G06N 3/08
2007/0192037 A1 * 8/2007 Jojic ....................... G16B 40/00
702/19

(Continued)

FOREIGN PATENT DOCUMENTS

WO    WO2109231624 A2    12/2019
WO    WO-2020243440 A1 * 12/2020 ........... G06N 3/0445

OTHER PUBLICATIONS

Deep-learning-based inverse design model for intelligent (Year: 2018).*

(Continued)

*Primary Examiner* — Omar F Fernandez Rivas
*Assistant Examiner* — Em N Trieu
(74) *Attorney, Agent, or Firm* — Scully, Scott, Murphy & Presser, P.C.; Caleb Wilkes

(57) ABSTRACT

A query-based generic end-to-end molecular optimization ("QMO") system framework, method and computer program product for optimizing molecules, such as for accelerating drug discovery. The QMO framework decouples representation learning and guided search and applies to any plug-in encoder-decoder with continuous latent representations. QMO framework directly incorporates evaluations based on chemical modeling, analysis packages, and pre-trained machine-learned prediction models for efficient molecule optimization using a query-based guided search method based on zeroth order optimization. The QMO features efficient guided search with molecular property evaluations and constraints obtained using the predictive models and chemical modeling and analysis packages. QMO tasks include optimizing drug-likeness and penalized log P scores with similarity constraints and improving the target binding affinity of existing drugs to pathogens such as the SARS-CoV-2 main protease protein while preserving the (Continued)

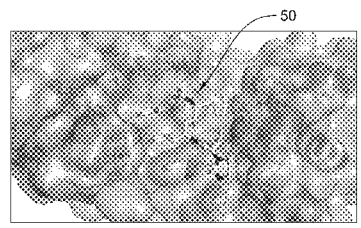

ORIGINAL (LOPINAVIR)

QMO-IMPROVED desired drug properties. QMO tasks further improves optimizing antimicrobial peptides toward lower toxicity.

18 Claims, 24 Drawing Sheets

(56) References Cited

U.S. PATENT DOCUMENTS

2020/0082916 A1   3/2020   Polykovskiy et al.
2020/0090049 A1   3/2020   Aliper et al.

OTHER PUBLICATIONS

Deep-learning-based inverse design model for intelligent discovery of organic molecules (Year: 2018).*
ZOO: Zeroth Order Optimization Based Black-box Attacks toDeep Neural Networks without Training Substitute Models (Year: 2017).*
AutoZOOM: Autoencoder-based Zeroth Order Optimization Method for Attacking Black-box Neural Networks (Year: 2019).*
Generative Network Complex for the Automated Generation of Drug-like Molecules (Year: 2020).*
Chenthamarakshan et al., "CogMol: Target-Specific and Selective Drug Design for COVID-19 Using Deep Generative Models," [Submitted on Apr. 2, 2020 (v1), last revised Jun. 24, 2020 (this version, v2)] https://arxiv.org/abs/2004.01215, 29 pages.
Liu, "A Primer on Zeroth-Order Optimization in Signal Processing and Machine Learning." [Submitted on Jun. 11, 2020 (v1), last revised Jun. 21, 2020 (this version, v2)], https://arxiv.org/abs/2006.06224, 13 pages.
Winter et al. "Efficient multi-objective molecular optimization in a continuous latent space." Chemical Science, vol. 10, 34, pp. 8016-8024, Jul. 8, 2019.
Wang et al., "Zeroth Order Optimization by a Mixture of Evolution Strategies," Sep. 25, 2019 (modified: Dec. 24, 2019), ICLR 2020 Conference Blind Submission, https://openreview.net/forum?id=SKIE_CNFPr, pp. 1-11.
Gómez-Bombarelli et al., "Automatic chemical design using a data-driven continuous representation of molecules," [Submitted on Oct. 7, 2016 (v1), last rev. Dec. 5, 2017 (this version, v3)], https://arxiv.org/abs/1610.02415, pp. 1-26.
Griffiths et al., "Constrained Bayesian optimization for automatic chemical design using variational autoencoders," Chem. Sci., 11, pp. 577-586, 2020.Downloaded on Aug. 7, 2020.
Zhao et al., "On the Design of Black-box Adversarial Examples by Leveraging Gradient-free Optimization and Operator Splitting Method", IEEE International Conference on Computer Vision, 2019, pp. 121-130.
Zhou et al., "Optimization of Molecules via Deep Reinforcement Learning", Scientific reports, vol. 9, No. 1, 2019, pp. 1-10.
Altschul et al., "Basic Local Alignment Search Tool", Journal of molecular biology, vol. 215, No. 3, 1990, pp. 403-410.
Bahdanau et al., "Neural machine translation by jointly learning to align and translate", in International Conference on Learning Representations, 2015, 15 pages.
Bickerton et al., "Quantifying the chemical beauty of drugs", Nature chemistry, vol. 4, No. 2, 2012, 27 pages.
Bohacek et al., "The art and practice of structure-based drug design: A molecular modeling perspective", Medicinal research reviews, vol. 16, No. 1, 1996, 3 pages (copy of table of contents attached).
Chen et al., "ZO-AdaMM: Zeroth-Order Adaptive Momentum Method for Black-Box Optimization", 33rd Conference on Neural Information Processing Systems (NeurIPS 2019), 2019, 12 pages.
Cheng et al., "Query-Efficient Hard-label Black-box Attack: An Optimization-based Approach", arXiv, Jul. 12, 2018, 12 pages.
Coates et al., "Novel classes of antibiotics or more of the same?", British journal of pharmacology, vol. 163, No. 1, 2011, pp. 184-194.
Dalke et al., "mmpdb: An Open-Source Matched Molecular Pair Platform for Large Multiproperty Data Sets", Journal of Chemical Information and Modeling, vol. 58, No. 5, 2018, pp. 902-910.

Das et al., "Accelerating Antimicrobial Discovery with Controllable Deep Generative Models and Molecular Dynamics", arXiv, Feb. 26, 2021, 64 pages.
Dossetter et al., "Matched Molecular Pair Analysis in drug discovery", Drug Discovery Today, vol. 18, No. 15-16, 2013, pp. 724-731.
Ertl et al., "Estimation of synthetic accessibility score of drug-like molecules based on molecular complexity and fragment contributions", Journal of Cheminformatics, vol. 1, Jun. 2009, 11 pages.
Fu et al., "CORE: Automatic Molecule Optimization Using Copy & Refine Strategy", The Thirty-Fourth AAAI Conference on Artificial Intelligence (AAAI-20), 2020, 8 pages.
Ghadimi et al., "Stochastic first-and zeroth-order methods for nonconvex stochastic programming," SIAM Journal on Optimization, vol. 23, No. 4, 2013, 25 pages.
Golovin et al., "Gradientless Descent: High-Dimensional Zeroth-Order Optimization", arXiv, May 18, 2020, 26 pages.
Griffen et al., "Matched Molecular Pairs as a Medicinal Chemistry Tool: Miniperspective", Journal of medicinal chemistry, vol. 54, No. 22, 2011, pp. 7739-7750.
Guimaraes et al., "Objective-Reinforced Generative Adversarial Networks (ORGAN) for Sequence Generation Models", arXiv, Feb. 7, 2018, 7 pages.
Gupta et al., "In Silico Approach for Predicting Toxicity of Peptides and Proteins", PloS one, vol. 8, No. 9, 2013, 10 pages.
Hasan et al., "HLPpred-Fuse: improved and robust prediction of hemolytic peptide and its activity by fusing multiple feature representation", Bioinformatics, vol. 36, Apr. 2020, pp. 3350-3356.
Huynh et al., "In Silico Exploration of the Molecular Mechanism of Clinically Oriented Drugs for Possibly Inhibiting SARS-COV-2's Main Protease", The Journal of Physical Chemistry Letters, vol. 11, 2020, pp. 4413-4420.
Ilyas et al., "Black-box Adversarial Attacks with Limited Queries and Information", International Coference on International Conference on Machine Learning, 2018, 10 pages.
Jang et al., "Categorical reparameterization with gumbel-softmax", Published as a conference paper at ICLR (International Conference on Learning Representations), 2017, 12 pages.
Jeon et al., "Identification of Antiviral Drug Candidates against SARS-COV-2 from FDA-Approved Drugs", Antimicrobial Agents and Chemotherapy, vol. 64, No. 7, Jul. 2020, 9 pages.
Jiménez-Luna et al., "DeltaDelta neural networks for lead optimization of small molecule potency", Chemical Science, vol. 10, No. 47, 2019, pp. 10911-10918.
Jin et al., "Hierarchical graph-to-graph translation for molecules", arXiv, Oct. 18, 2019, 14 pages.
Jin et al., "Junction Tree Variational Autoencoder for Molecular Graph Generation", Proceedings of the 35 th International Conference on Machine Learning, Stockholm, Sweden, PMLR 80, 2018, 10 pages.
Jin et al., "Learning multimodal graph-to-graph translation for molecule optimization", International Conference on Learning Representations, 2019, 13 pages.
Jin et al., "Structure of Mpro from SARS-COV-2 and discovery of its inhibitors", Nature, vol. 582, Jun. 2020, 24 pages.
Kingma et al., "Adam: A method for stochastic optimization", International Conference on Learning Representations, 2015, 15 pages.
Korovina et al., "ChemBO: Bayesian Optimization of Small Organic Molecules with Synthesizable Recommendations", Proceedings of the 23rdInternational Conference on Artificial Intelligence and Statistics (AISTATS) 2020, PMLR: vol. 108, 10 pages.
Landrum et al., "rdkit/rdkit: 2020_09_5 (Q3 2020) Release", https://doi.org/10.5281/zenodo.4570805, Mar. 1, 2021, 8 pages.
Liu et al., "signSGD via Zeroth-order Oracle", Published as a conference paper at ICLR (International Conference on Learning Representations), 2019, 24 pages.
Liu et al., "Zeroth-Order Online Alternating Direction Method of Multipliers: Convergence Analysis and Applications", in International Conference on Artificial Intelligence and Statistics, vol. 84, Apr. 9-11, 2018, pp. 288-297.
Liu et al., "Zeroth-Order Stochastic Variance Reduction for Nonconvex Optimization", 32nd Conference on Neural Information Processing Systems (NeurIPS 2018), 2018, 11 pages.

(56) References Cited

OTHER PUBLICATIONS

Maragakis, et al., A Deep-Learning View of Chemical Space Designed to Facilitate Drug Discovery, Journal of Chemical Information and Modeling, vol. 60, 2020, pp. 4487-4496.

Olivecrona et al., "Molecular de-novo design through deep reinforcement learning", Journal of cheminformatics, vol. 9, No. 1, 2017, 14 pages.

Polykovskiy et al., "Molecular Sets (Moses): A Benchmarking Platform for Molecular Generation Models", arXiv, Oct. 28, 2020, 19 pages.

Qin et al., "Artificial intelligence method to design and fold alphahelical structural proteins from the primary amino acid sequence", Extreme Mechanics Letters, vol. 36, 2020, 23 pages.

Reutlinger et al., "Multi-Objective Molecular De Novo Design by Adaptive Fragment Prioritization", Angewandte Chemie International Edition, vol. 53, No. 16, 2014, pp. 4244-4248.

Reymond et al., "The enumeration of chemical space," Wiley Interdisciplinary Reviews: Computational Molecular Science, vol. 2, No. 5, 2012, 2 pages (abstract only).

Rogers et al., "Extended-Connectivity Fingerprints", Journal of chemical information and modeling, vol. 50, No. 5, 2010, pp. 742-754.

Sanchez-Lengeling et al., "Optimizing distributions over molecular space. An Objective-Reinforced Generative Adversarial Network for Inverse-design Chemistry (Organic)", chemrxiv preprint chemrxiv. 5309668, 2017, 18 pages.

Skalic et al., "Shape-Based Generative Modeling for de Novo Drug Design", Journal of chemical information and modeling, vol. 59, No. 3, 2019, pp. 1205-1214.

Sterling et al., "ZINC 15 - Ligand Discovery for Everyone", Journal of chemical information and modeling, vol. 55, No. 11, 2015, pp. 2324-2337.

Trott et al., "AutoDock Vina: improving the speed and accuracy of docking with a new scoring function, efficient optimization and multithreading", Journal of Computational Chemistry, vol. 31, No. 2, 2010, pp. 455-461.

Weininger, "Smiles, a Chemical Language and Information System. 1. Introduction to Methodology and Encoding Rules", Journal of chemical information and computer sciences, vol. 28, No. 1, 1988, pp. 31-36.

Winter et al., "Learning continuous and data-driven molecular descriptors by translating equivalent chemical representations", Chemical science, vol. 10, No. 6, 2019, pp. 1692-1701.

Xiao et al., "iAMP-2L: A two-level multi-label classifier for identifying antimicrobial peptides and their functional types", Analytical Biochemistry, vol. 436, 2013, pp. 168-177.

Yang et al., "Improving Molecular Design by Stochastic Iterative Target Augmentation", Proceedings of the 37th International Conference on Machine Learning, Online, PMLR 119, 2020, 2020, 11 pages.

You et al., "Graph Convolutional Policy Network for Goal-Directed Molecular Graph Generation", 32nd Conference on Neural Information Processing Systems (NeurIPS 2018), 12 pages.

Yuan et al., LigBuilder 2: A Practical de Novo Drug Design Approach, Journal of chemical information and modeling, vol. 51, No. 5, 2011, pp. 1083-1091.

\* cited by examiner

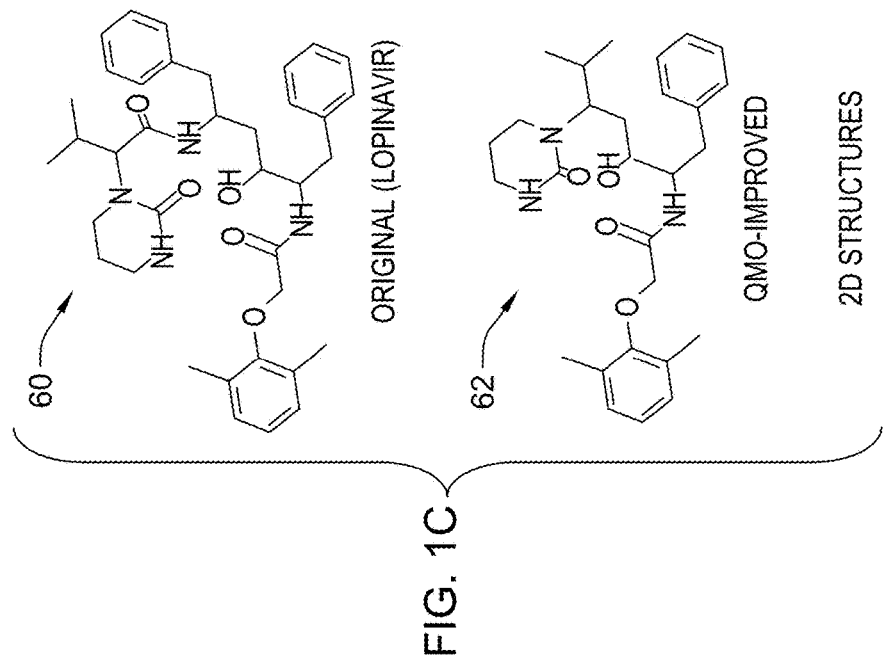
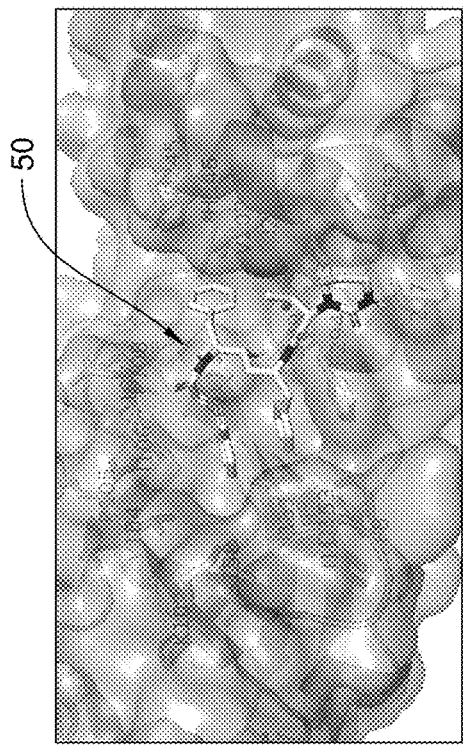
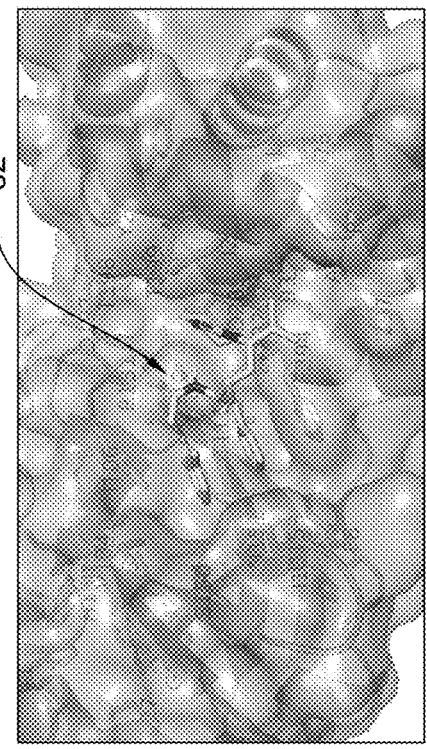
FIG. 1C
FIG. 1A ORIGINAL (LOPINAVIR)
FIG. 1B QMO-IMPROVED

500

| COMPOUND | EXPERIMENTAL IC50 (μM) | pIC50 | PREDICTED pIC50 |
|---|---|---|---|
| EBSELEN | 0.67 | 6.17 | 6.30 |
| TIDEGLUSIB | 1.55 | 5.81 | 6.29 |
| CARMOFUR | 1.82 | 5.74 | 8.07 |
| TDZD-8 | 2.15 | 5.67 | 5.94 |
| CHLOROQUINE | 7.28 | 5.14 | 5.46 |
| LOPINAVIR | 9.12 | 5.04 | 6.22 |
| DISULFIRAM | 9.35 | 5.03 | 5.54 |
| REMDESIVIR | 11.41 | 4.94 | 6.58 |
| SHIKONIN | 15.75 | 4.80 | 5.34 |
| PX-12 | 21.39 | 4.67 | 5.61 |
| CINANSERIN | 124.93 | 3.90 | 6.09 |

FIG. 6

| COMPOUND | AFFINITY ORIG. | AFFINITY IMP. | SIMILARITY | QED ORIG. | QED IMP. | SA ORIG. | SA IMP. | LOGP ORIG. | LOGP IMP. | DOCKING ORIG. | DOCKING IMP. |
|---|---|---|---|---|---|---|---|---|---|---|---|
| EBSELEN | 6.30 | 7.53 | 0.27 | 0.63 | 0.77 | 2.05 | 2.38 | 3.05 | 2.41 | LOW | HIGH |
| DISULFIRAM | 5.54 | 7.67 | 0.70 | 0.57 | 0.45 | 3.12 | 3.54 | 3.62 | 3.04 | HIGH | HIGH |
| TIDEGLUSIB | 6.29 | 8.14 | 0.40 | 0.58 | 0.79 | 2.28 | 2.48 | 3.26 | 1.98 | LOW | LOW |
| SHIKONIN | 5.34 | 8.15 | 0.29 | 0.58 | 0.67 | 3.41 | 4.15 | 2.12 | 2.14 | LOW | LOW |
| PX-12 | 5.61 | 7.57 | 0.24 | 0.74 | 0.63 | 3.98 | 3.96 | 2.95 | 3.56 | HIGH | HIGH |
| TDZD-8 | 5.94 | 7.98 | 0.66 | 0.75 | 0.80 | 2.39 | 2.51 | 0.66 | 1.14 | HIGH | HIGH |
| LOPINAVIR | 6.22 | 8.31 | 0.78 | 0.20 | 0.46 | 3.90 | 3.59 | 4.33 | 3.60 | LOW | LOW |
| CINANSERIN | 6.09 | 7.54 | 0.61 | 0.44 | 0.40 | 2.07 | 3.03 | 4.38 | 4.66 | LOW | LOW |
| CHLOROQUINE | 5.46 | 7.99 | 0.35 | 0.76 | 0.44 | 2.67 | 3.84 | 4.81 | 5.16 | LOW | HIGH |
| BROMHEXINE | 6.53 | 7.53 | 0.67 | 0.78 | 0.66 | 2.38 | 2.42 | 4.56 | 3.50 | HIGH | LOW |
| FAVIPIRAVIR | 5.37 | 8.44 | 0.67 | 0.55 | 0.49 | 2.90 | 2.78 | -0.99 | -2.03 | HIGH | HIGH |
| DIPYRIDAMOLE | 6.93 | 7.58 | 0.66 | 0.31 | 0.36 | 2.99 | 2.81 | -0.02 | -1.56 | LOW | HIGH |
| AMBROXOL | 7.46 | 7.76 | 0.50 | 0.71 | 0.53 | 2.50 | 3.29 | 3.19 | 2.68 | LOW | LOW |
| HYDROXYCHLOROQUINE | 6.05 | 7.68 | 0.61 | 0.73 | 0.22 | 2.79 | 3.49 | 3.78 | 1.60 | LOW | LOW |
| GS-441524 | 6.38 | 7.86 | 0.81 | 0.50 | 0.66 | 4.38 | 4.60 | -1.86 | -0.88 | LOW | LOW |
| KAEMPFEROL | 6.20 | 7.57 | 0.43 | 0.55 | 0.66 | 2.37 | 2.13 | 2.28 | 3.21 | LOW | LOW |
| ENTECAVIR | 5.77 | 7.54 | 0.55 | 0.53 | 0.53 | 4.09 | 4.36 | -0.83 | -0.57 | LOW | HIGH |
| UMIFENOVIR | 6.24 | 7.56 | 0.43 | 0.38 | 0.58 | 2.68 | 2.62 | 5.18 | 3.99 | LOW | LOW |
| QUERCETIN | 5.59 | 7.56 | 0.66 | 0.43 | 0.51 | 2.54 | 2.36 | 1.99 | 2.28 | LOW | LOW |
| REMDESIVIR | 6.58 | 7.55 | 0.55 | 0.16 | 0.17 | 4.82 | 4.94 | 2.31 | 1.72 | LOW | LOW |
| NELFINAVIR | 6.63 | 7.85 | 0.82 | 0.33 | 0.28 | 4.04 | 4.16 | 4.75 | 4.99 | LOW | LOW |
| CURCUMIN | 5.44 | 7.63 | 0.82 | 0.55 | 0.46 | 2.43 | 2.26 | 3.37 | 2.97 | LOW | LOW |
| N3 | 6.66 | 7.52 | 0.82 | 0.12 | 0.15 | 4.29 | 3.96 | 2.08 | 3.36 | LOW | LOW |
| O6K | 6.18 | 7.78 | 0.57 | 0.25 | 0.39 | 4.12 | 3.40 | 2.22 | 3.15 | LOW | LOW |
| AVERAGE CHANGE | 1.64 | | 0.58 | 0.00 | | 0.16 | | -0.21 | | — | |

| METHOD | SUCCESS (%) |
|---|---|
| MMPA | 32.9 |
| JT-VAE  ─601 | 8.8  ─602 |
| GCPN | 9.4 |
| VSeq2Seq | 58.5 |
| VJTNN+GAN | 60.6 |
| AtomG2G | 73.6 |
| HierG2G | 76.9 |
| DESMILES | 77.8 |
| QMO | 92.8  ─605 |

| METHOD | IMPROVEMENT | |
|---|---|---|
| | $\delta = 0.6$ | $\delta = 0.4$ |
| JT-VAE (651) | 0.28 ± 0.79 | 1.03 ± 1.39 (652) |
| GCPN | 0.79 ± 0.63 | 2.49 ± 1.30 |
| VSeq2Seq | 2.33 ± 1.17 | 3.37 ± 1.75 |
| VJTNN | 2.33 ± 1.24 | 3.55 ± 1.67 |
| QMO (655) | 3.73 ± 2.85 | 7.71 ± 5.65 |

FIG. 9

| PEPTIDE SEQUENCE (OF AMINO ACID SYMBOLS) | | HLP (YES/NO) | |
|---|---|---|---|
| ORIGINAL | IMPROVED | ORIG. | IMP. |
| RRGWRLVLALVY | RGGNNILLRAV | Y | N |
| RRGWVLALVLYYGRR | RVGLALARSERCR | Y | N |
| QRLFQVKGRR | QLREVKRR | Y | N |
| RRGWVLDLVLYYGRR | SGTGVVKLVDVNR | Y | N |
| GRSRWRDVCRNFMRR | GRVLVWVWRLTWHSMHMHRM | Y | N |
| AVIPPLRCKAAFC | AVIPPLRCKKAACQ | Y | N |

| Compounds | Original SMILES | Improved SMILES |
|---|---|---|
| (H) Ebselen | C1=CC=C(C=C1)N2C(=O)C3=CC=CC=C3S2 | CCSc1nn(-c2ccccc2)c(=O)s1 |
| (G) Disulfiram | CCN(CC)C(=S)SSC(=S)N(CC)CC | CCN(CC)C(=S)SSC(=O)S |
| (V) Tideglusib | C1=CC=C(C=C1)CN2C(=O)N(SC2=O)C3=CC=CC=C43 | OCCc1nn(c2ccccc3ccccc32)c(=O)s1 |
| (T) Shikonin | CC(=CCC(C1=CC(=C(C2=C(C=CC(=C2C1=O)O)O)C | CC(C)=CCC(C(=O)C(O)C1=C(O)C=CCCC1=O |
| (Q) PX-12 | CCC(C)SSC1=NC=CN1 | CCC(C)SC(C)CC(F)F |
| (U) TDZD-8 | CN1C(=O)N(C(=O)S1)CC2=CC=CC=C2 | CCn1c(=O)n(Cc2ccccc2)c(=O)s1 |
| (W) lopinavir | CC1=C(C=CC=C1C)OCC(=O)NC(CC2=CC=CC=C2)C(CC(CC3=CC=CC=C3)NC(=O)C(C(C)C)N4CCCNC4=O)O | Cc1ccc(C)c1OCC(=O)NC(Cc1ccccc1)C(O)CC(C(C)N1CCCNC1=O)Cc1ccccc1 |
| (D) Cinanserin | CN(C)CCCSC1=CC=CC=C1NC(=O)C=CC2=CC=CC=C2 | CN(C)CCCCSc1ccccc1NC(=O)C=CC1C(C)(C)C1 |
| (C) Chloroquine | CCN(CC)CCCC(C)NC1=C2C=CC(=CC2=NC=C1)Cl | CCN(CC)CCCC(C)NC(C)CC(C)C(C)CCCCl |
| (B) Bromhexine | CN(CC1=C(C=C(C=C1Br)Br)N)C2CCCCC2 | CN(Cc1cc(Br)cc(N)c1O)C1CCCCC1 |
| (J) Favipiravir | C1=C(N=C(C(=O)N1)C(=O)N)F | NC(=O)c1c[nH]c(=O)c(C(N)=O)n1 |
| (F) Dipyridamole | C1CCN(CC1)C2=NC(=NC3=C2N=C(N=C3N4CCCCC4)N(CCO)CCO)N(CCO)CCO | OCCN(c1nc(N2CCCCC2)nc(N(CCO)CCO)n1)CCO |
| (A) Ambroxol | C1CC(CCC1NCC2=C(C(=CC(=C2)Br)Br)N)O | Nc1c(Br)cc(Br)cc1CNC1CCC(O)C1 |
| (L) Hydroxychloroquine | CCN(CCCC(C)NC1=CC2=CC=C(C=C2)Cl)CCO | CCN(CCO)CCCNC(C)NCNNc1ccnc2cc(Cl)ccc12 |
| (K) GS-441524 | C1=C2C(=NC=NN2C=C1)C3(C(C(C(O3)CO)O)O)C#N)N | N#CC1(c2ccc3c(N)ncnn32)OC(CO)C(F)C1O |
| (M) Kaempferol | C1=CC(=CC=C1C2=C(C(=O)C3=C(C=C(C=C3O2)O)O)O)O | O=C(O)c1c(-c2ccc(O)cc2)oc2cc(O)ccc12 |
| (I) Entecavir | C=C1C(CC(C1CO)O)N2C=NC3=C2N=C(NC3=O)N | C=C1C(CO)C(O)CC1n1cnc(N)c1CO |
| (X) umifenovir | CCOC(=O)C1=C(N(C2=CC(=C(C(=C21)CN(C)C)O)Br)C)CSC3=CC=CC=C3 | CCCOC(=O)c1c(CSc2ccccc2)c(n(C)c1OCC=O)c1c(-c2ccc(O)c(O)c2)oc2cc(O)ccc12 |
| (R) Quercetin | C1=CC(=C(C=C1C2=C(C(=O)C3=C(C=C(C=C3O2)O)O)O)O | O=c1c(-c2ccc(O)c(O)c2)oc2cc(O)ccc12 |
| (S) Remdesivir | CCC(CC)COC(=O)C(C)NP(=O)(OCC1C(C(C(O1)(C#N)C2=CC=C3N=C3N)O)O)OC4=CC=CC=C4 | CCC(CC)COC(=O)C(C)NP(=O)(OCC1OC(C#N)(c2ccccc2)C(N)C(O)C1O)OC(C)C |
| (O) Nelfinavir | CC1=C(C=CC=C1O)C(=O)NC(CSC2=CC=CC=C2)C(CN3CC4CCCCC4CC3C(=O)NC(C)(C)C)O | Cc1c(O)cccc1C(=O)NC(CSc1ccccc1)C(O)CN1C2CCCCC2CC1C(=O)NC(C)(C)C |
| (E) Curcumin | COC1=C(C=CC(=C1)C=CC(=O)CC(=O)C=CC2=CC(=C(C=C2)O)OC)O | COc1cc(C=CC(=O)CC(=O)C=Cc2ccc(O)c(OC)c2)ccc1O |
| (N) N3 | CC(C)CC(NC(=O)NC(=O)c1cc(C)on1)C(C)C)C(=O)NC(CC2CCNC2=O)CC(=O)OCc3ccccc3 | Cc1cc(C(=O)NC(C(=O)NC(CC(=O)NC(CC(C)C)C(=O)NC(C(=O)OCc2ccccc2)CC2CCC2)C(C)C)no1 |
| (P) O6K | CC(C)(C)OC(=O)Nc1ccn(C(CC2CC2)C(=O)NC(CC2CCNC2=O)C(=O)C(=O)NCc2ccccc2)c1=O | CC(C)(C)OC(=O)Nc1ccn(C(CC2)C(=O)NC(CC2CCNC2)C(=O)OCc2ccccc2)c1=O |

FIG. 13

| Compound ~877 | Docking Energy | | Binding Pocket | |
|---|---|---|---|---|
| | orig. | imp. | orig. | imp. |
| (H) Ebselen | -6.1 | -5.5 | 0 | 0 |
| (G) Disulfiram | -4.1 | -3.6 | 0 | 0 |
| (V) Tideglusib | -8.1 | -6.9 | 0 | 2 |
| (T) Shikonin | -6.7 | -6.6 | 1 | 1 |
| (Q) PX-12 | -4.2 | -4.3 | 0 | 1 |
| (U) TDZD-8 | -5.6 | -5.7 | 1 | 1 |
| (W) Lopinavir | -8.2 | -6.8 | 1 | 1 |
| (D) Cinanserin | -6.4 | -6.0 | 1 | 0 |
| (C) Chloroquine | -6.0 | -4.7 | 1 | 0 |
| (B) Bromhexine | -5.8 | -6.0 | 1 | 0 |
| (J) Favipiravir | -4.9 | -5.5 | 1 | 0 |
| (F) Dipyridamole | -6.1 | -6.3 | 2 | 0 |
| (A) Ambroxol | -6.4 | -6.0 | 0 | 0 |
| (L) Hydroxychloroquine | -6.1 | -6.2 | 0 | 0 |
| (K) GS-441524 | -6.3 | -6.5 | 1 | 0 |
| (M) Kaempferol | -6.6 | -7.3 | 0 | 0 |
| (I) Entecavir | -7.1 | -5.6 | 0 | 0 |
| (X) Umifenovir | -6.6 | -6.0 | 0 | 0 |
| (R) Quercetin | -7.5 | -7.4 | 0 | 0 |
| (S) Remdesivir | -7.2 | -6.4 | 0 | 0 |
| (O) Nelfinavir | -8.2 | -8.3 | 2 | 0 |
| (E) Curcumin | -6.7 | -6.9 | 0 | 1 |
| (N) N3 | -7.7 | -7.2 | 1 | 1 |
| (P) O6K | -7.9 | -6.8 | 0 | 0 |

FIG. 14

QUERY-BASED MOLECULE OPTIMIZATION AND APPLICATIONS TO FUNCTIONAL MOLECULE DISCOVERY

FIELD

The present invention relates generally to machine-learning systems and methods for optimizing molecules, and in particular, to a query-based molecule optimization framework guided by molecular property prediction models and similarity metrics.

BACKGROUND

Molecule optimization (MO) for improving the structural and/or functional profile of a molecule is an essential step in drug discovery and in many other applications. In recent years, machine learning has shown to be a promising tool for MO by combining domain knowledge and relevant datasets for efficient drug discovery.

However several challenges exist: In case of designing drugs for new emerging viruses, there is not enough training data and not much is known about the virus. Thus, current translation-based approaches to MO that require paired training sequences may not have enough training data on a specific task or disease (e.g. novel virus) to learn how to optimize a drug molecule.

A further challenge is that in designing drug there is imposed multiple constraints (e.g. affinity, toxicity, synthesizability, similarity, length), and these constraints must be satisfied for a sequence to be optimized to be useful in the real world. That is, for MO, other chemical properties of the original molecule being optimized must not be changed (e.g., new optimized molecule must still remain non-toxic). Further, existing methods need to be retrained for new tasks.

Still another challenge is that in designing drugs, a molecule is presented as a sequence of molecular symbols, and thus optimization requires actions taken in discrete output space (sequences) and possible black-box models make implementation of direct gradient descent difficult.

SUMMARY

A system, method and computer program product for optimizing a molecule sequence.

An end-to-end query based molecular optimization (QMO) system and methodology for optimizing molecules used for the treatment of illnesses, e.g., viruses, that disentangles representation learning of molecule sequences and guided search for molecule optimization (e.g., sampling, model fitting, filtering).

An end-to-end query based molecular optimization (QMO) system and methodology for optimizing molecules that does not require much training data and can handle multi-objective optimization: property constraints (toxicity, affinity, etc) and molecular constraints (similarity, length, etc).

An end-to-end query based molecular optimization (QMO) system and methodology for accelerating drug discovery using discrete sequence representations of molecules (symbols in a sequence) and can use block-box models.

A QMO system and methodology that is readily applicable for use with any pre-trained encoder-decoder with continuous latent representations.

A QMO system and methodology that makes use of black-box optimization (i.e., zeroth-order optimization) for end-to-end learning.

In one aspect, there is provided a query-based molecule optimization method. The method comprises: modifying, by the at least one hardware processor, a sequence structure corresponding to a molecule to be optimized; running, by the at least one hardware processor, a plurality of machine learned prediction models for the modified sequence structure for predicting a respective plurality of properties of a molecule corresponding to the modified sequence structure and generating loss values as a measure of differences between a respective plurality of property predictors and a corresponding respective plurality of specified threshold constraints, and using the generated loss values as a guide for further modifying the sequence structure for evaluation of the respective plurality of predicted properties; determining by the at least one hardware processor whether the each of the plurality of properties predicted for the corresponding further modified sequence structure satisfy all the corresponding respective plurality of specified threshold constraints; and determining the corresponding further modified sequence structure as an optimized original molecule when each of the plurality of properties predicted for the further modified sequence structure satisfies all the respective plurality of specified threshold constraints.

In a further embodiment, there is provided a computer-implemented query-based molecule optimization system. The system comprises: a memory storage device; and a hardware processor coupled to the memory storage device and configured to perform a method to: modify a sequence structure corresponding to a molecule to be optimized; run a plurality of machine learned prediction models for the modified sequence structure for predicting a respective plurality of properties of a molecule corresponding to the modified sequence structure and generate loss values as a measure of differences between a respective plurality of property predictors and a corresponding respective plurality of specified threshold constraints, and using the generated loss values as a guide for further modifying the sequence structure for evaluation of the respective plurality of predicted properties; determine whether the each of the plurality of properties predicted for the corresponding further modified sequence structure satisfy all the corresponding respective plurality of specified threshold constraints; and determine the corresponding further modified sequence structure as an optimized original molecule when each of the plurality of properties predicted for the further modified sequence structure satisfies all the respective plurality of specified threshold constraints.

In a further aspect, there is provided a computer program product for performing operations. The computer program product includes a storage medium readable by a processing circuit and storing instructions run by the processing circuit for running a method. The method is the same as listed above.

BRIEF DESCRIPTION OF THE SEVERAL VIEWS OF THE DRAWINGS

FIGS. 1A-1B depicts an example binding of a candidate drug (Lopinavir) (FIG. 1A) and its QMO-optimized variant binding (FIG. 1B) with a SARS-CoV-2 $M^{pro}$, as obtained using docking simulations for validation and showing their

FIG. 6 shows a table including the experimental IC50 values for several COVID-19 drug candidates examined in a demonstration as compared with their predicted affinity values;

FIG. 7 depicts a table summarizing QMO optimization results for 24 existing drug candidates for SARS-CoV-2 Mpro including Original (orig.) and improved (imp.) binding affinity and their similarity for multiple properties;

FIG. 8 depicts a table including QMO optimization results indicating the performance of drug likeness (QED) task with a specified Tanimoto similarity constraint value $\delta$;

FIG. 9 shows a table depicting performance improvement of penalized log P task at various Tanimoto similarity constraint values $\delta$ as compared to results obtained using other methods;

FIG. 13 shows a table having a column including the SMILES representations of these same original and improved versions of molecules (COVID-19 drug candidate compounds) that correspond to the 24 molecule pairs depicted in respective FIGS. 12A-12X;

FIG. 14 depicts a table including results of an extended docking analysis indicating the best (lowest) binding free energy over multiple runs, and closest binding pocket;

FIGS. 17A-17B depict the cumulative success (Y-axis) effect of multiple restarts (x-axis) for two example configurations running QMO on the QED tas; and.

DETAILED DESCRIPTION

A system, method and computer program product for molecule optimization, e.g., optimizing molecules against properties including, but not limited to: binding affinity, molecular similarity, lipophilicity (log P), toxicity. In an embodiment, the system and method for molecule optimization is used for accelerating drug discovery for the treatment of illnesses, e.g., such as caused by viruses, sicknesses, phages, communicable diseases, poison, contagions, infections, germs, toxin and microbes and microorganisms.

In particular, an end-to-end generic query-based molecular optimization ("QMO") framework includes systems, methods and computer program products employing an encoder-decoder framework and external guidance. The QMO end-to-end query-based molecular optimization framework decouples representation learning and guided search and applies to any plug-in encoder-decoder with continuous latent representations. That is, the guided search method is agnostic to how the molecule representations (encoder-decoder) are learned and trained. It also incorporates multiple predictions and evaluations made directly at the sequence level into guided search without further model fitting.

In a further embodiment, to achieve efficient end-to-end optimization with discrete molecule sequences and their continuous latent representations, QMO adopts a query-based guided search method based on zeroth order optimization. Its query-based guided search enables direct optimization over the evaluations provided by chemical packages or prediction APIs.

Figure 2:
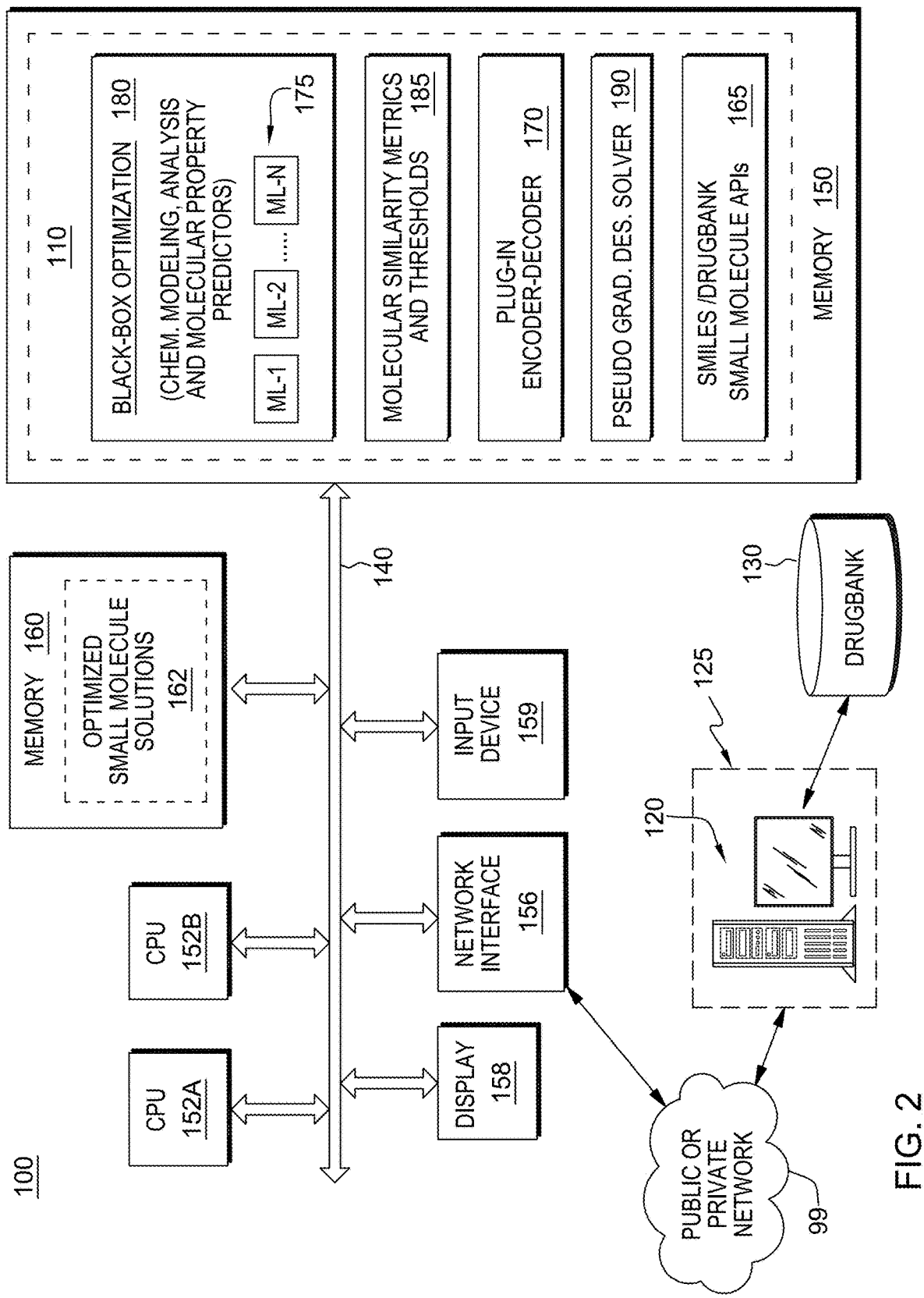

FIG. 2 depicts a computer system providing the end-to-end generic query based molecular optimization framework according to one embodiment. In some aspects, system 200 may include a computing device, a mobile device, or a server. In some aspects, computing device 200 may include, for example, personal computers, laptops, tablets, smart devices, smart phones, or any other similar computing device.

Computing system 100 includes one or more hardware processors 152A, 152B, a memory 150, e.g., for storing an operating system and program instructions, a network interface 156, a display device 158, an input device 159, and any other features common to a computing device. In some aspects, computing system 100 may, for example, be any computing device that is configured to communicate with one or more web-sites 125 including a web- or cloud-based server 120 over a public or private communications network 99. For instance, a web-site may include the commercially available DrugBank Version 5.0 database resource 130 (e.g., available at www.drugbank.ca) that combines detailed drug (i.e. chemical, pharmacological and pharmaceutical) data with comprehensive drug target (i.e. sequence, structure, and pathway).

Further, as shown as part of system 100, there is provided a local memory useful for the iterative QMO framework processing which may include an attached memory storage device 160, or a remote memory storage device, e.g., a database, accessible via a remote network connection for input to the system 100.

In the embodiment depicted in FIG. 2, processors 152A, 152B may include, for example, a microcontroller, Field Programmable Gate Array (FPGA), or any other processor that is configured to perform various operations. Additionally shown are the communication channels 140, e.g., wired connections such as data bus lines, address bus lines, Input/Output (I/O) data lines, etc., for routing signals between the various components of system 100. Processors 152A, 152B are configured to execute method instructions as described below. These instructions may be stored, for example, as programmed modules in a further associated memory storage device 150.

Memory 150 may include, for example, non-transitory computer readable media in the form of volatile memory, such as random access memory (RAM) and/or cache memory or others. Memory 150 may include, for example, other removable/non-removable, volatile/non-volatile storage media. By way of non-limiting examples only, memory 150 may include a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing.

Network interface 156 is configured to transmit and receive data or information to and from a web-site server 120, e.g., via wired or wireless connections. For example, network interface 156 may utilize wireless technologies and communication protocols such as Bluetooth®, WIFI (e.g., 802.11a/b/g/n), cellular networks (e.g., CDMA, GSM, M2M, and 3G/4G/4G LTE), near-field communications systems, satellite communications, via a local area network (LAN), via a wide area network (WAN), or any other form of communication that allows computing device 100 to transmit information to or receive information from the server 120.

Display 158 may include, for example, a computer monitor, television, smart television, a display screen integrated into a personal computing device such as, for example, laptops, smart phones, smart watches, virtual reality headsets, smart wearable devices, or any other mechanism for displaying information to a user. In some aspects, display 158 may include a liquid crystal display (LCD), an e-paper/e-ink display, an organic LED (OLED) display, or other similar display technologies. In some aspects, display 158 may be touch-sensitive and may also function as an input device.

Input device 159 may include, for example, a keyboard, a mouse, a touch-sensitive display, a keypad, a microphone, or other similar input devices or any other input devices that may be used alone or together to provide a user with the capability to interact with the computing device 100.

With respect to configuring the computer system 100 as a QMO framework for optimizing molecules to accelerate drug discovery, the local or remote memory 160 may be configured for temporarily storing an optimized small molecule sequence result or sets of optimized small molecule sequences 162 (e.g., or latent representations thereof) with therapeutic potential for given MO tasks obtained from running QMO. In an embodiment, latent representations of the small molecules may be stored as obtained from a plug-in encoder-decoder. These latent representations of small molecules 162 can be converted into an ASCII text-string format such as obtained via a SMILES (Simplified Molecular-Input Line-Entry System) web-based interface. Alternately or in addition, the latent representations of small molecules can be stored in a local memory attached to the computer system 100.

As mentioned, memory 150 of computer system 100 further stores processing modules that include programmed instructions adapted to invoke QMO framework operations for optimizing molecules to accelerate drug discovery.

In one embodiment, one of the programmed processing modules stored at the associated memory 150 include a module 165 that can search/collect small molecule data from a Drugbank or like data source 130 by interacting with or using application program interfaces (APIs). In an embodiment, this module 190 can further invoke methods to transform collected small molecule data for an existing or known drug structure into a one-dimensional ASCII string representation via a SMILEs API. In other embodiments, an amino acid representation of the drug structure (e.g., amino acid symbols for chemical string representation) can be used in place of the SMILES representation.

In one embodiment, one of the programmed processing modules stored at the associated memory 150 include a pre-trained encoder-decoder plug-in module 170 providing instructions that, when run by a processor, configures the system to process the molecule string representation and latent representations (e.g., from SMILES) to perform end-to-end searches. Any encoder-decoder plug-in with continuous latent representations can be used. The encoder-decoder 170 encodes a 1-dimension string representation of a drug molecule (e.g., a SMILES representation of a sequence of symbols or chemical characters), and converts the string into a latent vector representation (i.e., maps the string to a vector space), and performs an optimization in the continuous vector space. The decoder decodes the latent vector representation (optimized in the vector space) and reconstructs a 1-dimension string representation for the optimized molecule.

In one embodiment, another processing module stored at the associated computer memory 150 includes a black-box optimization program module 180 that handles multi-objective optimization on the latent vector representation. The multi-objective optimization includes, but is not limited to: imposing property constraints (e.g., toxicity, binding affinity, drug-likeness, log P, etc.) and imposing molecular constraints (e.g., similarity, length, etc.) in the QMO framework. This black-box optimization module 180 can include modules for efficient searching of the latent representations to find an improved molecule and implements black-box modules, e.g., chemical modeling/analysis packages and pre-trained black-box machine learning (ML) based molecular property prediction model(s) 175, e.g., ML-model 1, ML-model 2, . . . , ML-model N, each running on or accessible by the system, and trained to predict molecular properties for efficient small molecule optimization.

These further programmed processing modules 175 include thresholds and molecular metrics 185 for use in the evaluating of the properties of interest of candidate molecules obtained by QMO. These constraints and thresholds may be specified in advance by users such as researchers or drug designers and provide the external "guidance" for molecular optimization. These black-box models can handle multi-objective optimization: property constraints (toxicity, affinity, drug-likeness, log P, etc) and molecular constraints (similarity, length). For example, in an embodiment, QMO is evaluated according to two benchmark tasks, drug-likeness (QED) and penalized log P optimization with similarity constraints.

A further programmed processing module stored at the associated memory 150 include a "zeroth order" solver module 190 providing an interface processors for running a zeroth order or pseudo gradient descent method for solving the multi-objective molecular optimization problem. Rather than using a first-order gradient, this module 190 implements a solver that performs a gradient estimate as the information of the gradient of the black-box predictor model is not known. In an embodiment, a function value(s) returned from a black-box function $f_i(\text{Dec}(z))$ are used to determine the optimization where Dec(z) is the decoded output representation of a candidate molecule sequence input to the black-box model. Efficient queries in the form of applied random perturbations are made to the latent representations to improve the molecule.

Figure 3:
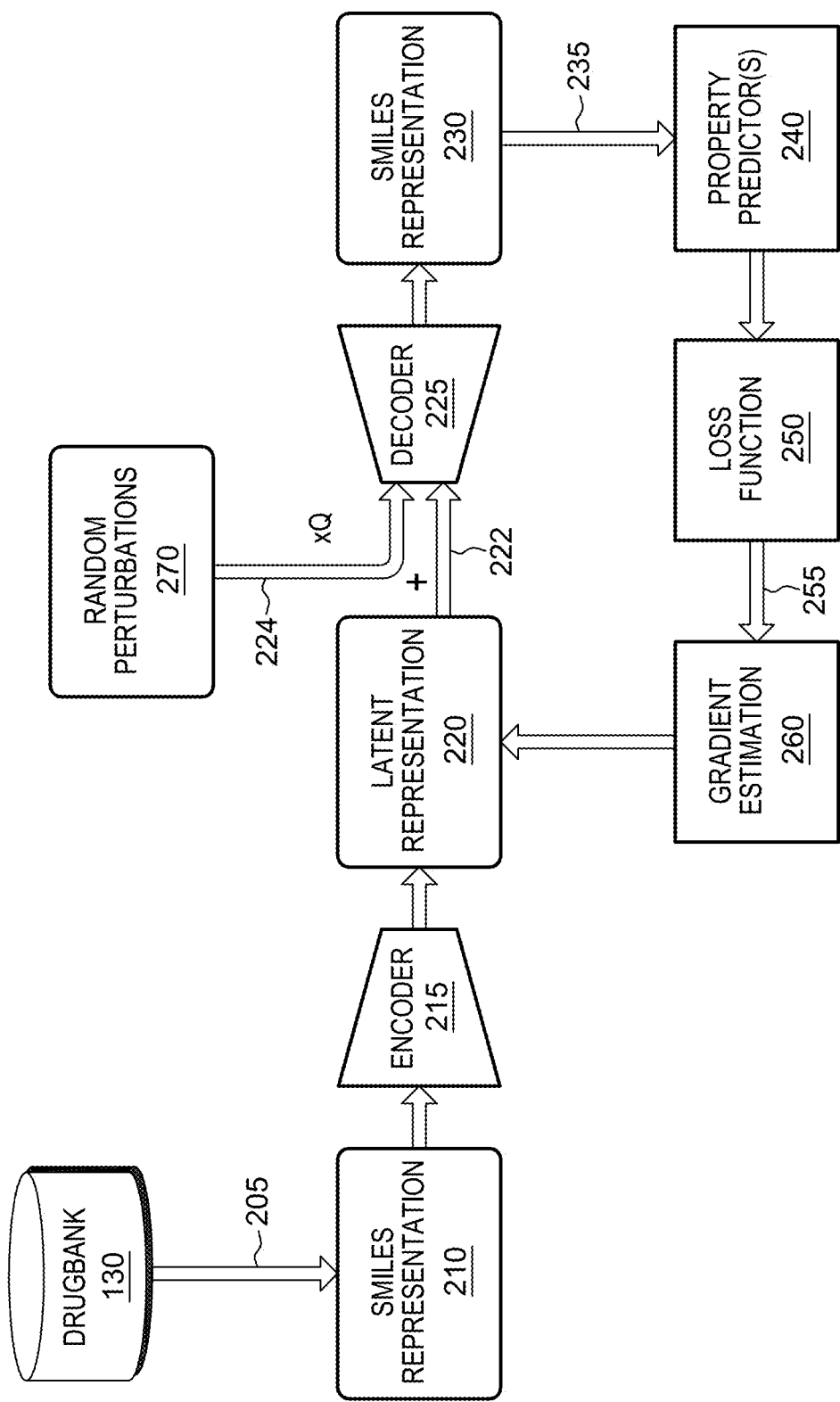
FIG. 3 depicts an overview of an iterative method run by supervisory program to automatically implement the end-to-end query based MO tasks in the QMO system framework of FIG. 2.

As further shown, memory 150 includes a supervisory program 110 having instructions for configuring the computing system 100 to invoke the end-to-end molecule optimization operations described herein with respect to FIG. 3, i.e., provide application program interfaces for running the QMO "black-box" optimization algorithms and run the end-to-end query based MO tasks that call each of the program modules for molecular optimization in the QMO framework used to accelerate drug discovery.

FIG. 3 depicts an overview of an iterative method run by supervisory program 110 to automatically implement the end-to-end query based MO tasks in the QMO framework 200. In an embodiment, the QMO framework 200 implements the black-box optimization approach to find molecules with high similarity and improved affinity, while preserving other properties of interest such as drug-likeness. A high similarity to existing drugs is important for rapid response to a novel pathogen, e.g., SARS-CoV-2, since then existing knowledge and manufacturing pipelines can be leveraged for wet lab evaluation of the optimized variants.

In FIG. 3, in the query-based molecule optimization framework 200, there is first performed a modeling of a molecule as a discrete string of chemical characters (i.e., a sequence). Depending on the downstream MO tasks, the sequence representation can either be a string of primary amino acids, or a string designed for encoding small organic molecules. In particular, the simplified molecular input line entry specification (SMILES) representation describes the structure of chemical species using a 1-dimensional sequence of symbols, e.g., ASCII strings 210. The initial chemical species or molecule is an initial or original drug a researcher may estimate can be optimized for use as a potential chemical for treating a pathogen.

That is, in one embodiment, to obtain a drug set or drug library, the computer system harvests the SMILES (Simplified Molecular-Input Line-Entry System) notation used for the ASCII encoding of molecular structures of any small molecule 205 obtained from a database source of chemical species. One such source is the DrugBank database 130, e.g., DrugBank 5.0. Sequences may additionally be downloaded from the protein data bank (rcsb.org).

Without loss of generality, the product space containing every possible molecule sequence of length m is defined as $$\mathbb{X}^m := \mathbb{X} \times \mathbb{X} \ldots \times \mathbb{X}$$

where $\mathbb{X}$ denotes the set of all chemical characters. The space of small molecules with therapeutic potential is estimated to be on the order of $10^{60}$. Therefore, the problem of MO in the ambient space $\mathbb{X}^m$ can be computationally inefficient as the search space grows combinatorially with the sequence length m.

Given the large search space for molecule sequences, QMO 200 uses the encoder-decoder component 170. The encoder component 215 performs an encoding (Enc: $\mathbb{X}^m \mapsto \mathbb{R}^d$) of a sequence $x \in \mathbb{X}^m$ to a low-dimensional continuous real-valued vector representation 220 of dimension d, denoted by $z=\text{Enc}(x)$, where $d \ll m$ (the ambient dimension). The decoder component 225 performs a decoding (Dec: $\mathbb{R}^d \mapsto \mathbb{X}^m$) of the latent vector representation z of x back to the sequence representation, denoted by $\hat{x}=\text{Dec}(z)$. That is, the decoder 225 takes a latent presentation z as input and produces a decoded sequence $\hat{x}$ as output. Depending on the encoder-decoder 170 implementation, the input sequence x and the decoded sequence $\hat{x}$ may be of different length. On the other hand, the latent dimension d is universal (fixed) to all sequences. In one example embodiment, there is used a molecular descriptor such as proposed in a reference to R. Winter, F. Montanari, F. Noé, and D.-A. Clevert entitled "Learning continuous and data-driven molecular descriptors by translating equivalent chemical representations," Chemical science, vol. 10, no. 6, pp. 1692-1701, 2019. This molecular descriptor can be used for an autoencoder to learn latent representations 220 featuring high similarity between the original and the reconstructed sequences.

As mentioned, QMO applies to any plug-in encoder-decoder framework 170 with continuous latent representations for decoupling representation learning and guided search. Typical encoder-decoder examples include a deterministic auto-encoder (AE) trained on a reconstruction loss between x and $\hat{x}$, and a variational auto-encoder (VAE) that learns a latent variational distribution by optimizing a (penalized) log-likelihood function.

In the QMO framework 200 of FIG. 2, the method further includes applying random perturbations 270 to a given latent representation z 222 input to the decoder 225 and SMILES is invoked to produce a decoded sequence 235 as a candidate optimized molecule 235 for evaluation by black-box predictors 240. By applying a random perturbation 224 to the latent representation z input to the decoder, the decoded sequences of z (plus some perturbation) are used for molecule optimization. As described in greater detail below, the perturbation includes neighboring data points of z and using that perturbed sequence for molecule optimization.

The QMO framework 200 then performs molecule optimization formulation via guided search. That is, in addition to leveraging learned latent representations 220, the QMO framework incorporates various (black-box) molecular property prediction models 240 and similarity metrics at the sequence level as external guidance. In an embodiment, the QMO framework methodology employs a guidance from the predictive models 240 and/or evaluations from statistical models, where a search conducted can be either in the discrete molecule sequence space or through a continuous latent space (or distribution) learned by the encoder-decoder. Specifically, for any given sequence $x \in \mathbb{X}^m$, the method performs evaluating the sequence using a set of I separate prediction models $\{f_i(x)\}_{i=1}^I$. The prediction models 240 are used to evaluate the properties of interest for MO. In principle, for a candidate sequence x, a set of thresholds $\{\tau_i\}_{i=1}^I$ on its property predictions $\{f_i(x)\}_{i=1}^I$ is used for validating the condition $f_i(x) \geq \tau_i$ for all $i \in [I]$, where [I] denotes the integer set $\{1, 2, \ldots, I\}$. Moreover, there is simultaneously imposed a set of J separate constraints $\{g_j(x|S) \leq \eta_j\}_{j=1}^J$ in the optimization process, such as molecular similarity, relative to a set of reference molecule sequences denoted by S. In an embodiment, using a SMILES representation 230 of the decoded sequence $\hat{x}$, the set of prediction models 240 are used to evaluate the sequence 235. In an embodiment, when comparing molecular similarity, the decoded sequence will be evaluated together with the original sequence.

In an embodiment, the QMO framework 200 of FIG. 2 covers two practical cases in MO: (i) optimizing molecular similarity while satisfying desired chemical properties, and (ii) optimizing chemical properties with similarity constraints. For Case (i), a designed loss function 250 is formally defined to combine multiple property evaluations. Given a starting molecule sequence $x_0$ (e.g., a known drug) and a trained encoder-decoder, let $x=\text{Dec}(z)$ denote a candidate sequence 235 decoded from a latent representation $z \in \mathbb{R}^d$. In an embodiment, z is a 2-dimensional vector representation. The QMO framework employs a mathematical solver to find an optimized sequence by solving the continuous optimization problem according to equation (1) as follows:

$$\text{Minimize}_{z\in\mathbb{R}^d} \underbrace{\sum_{i=1}^{I} \max\{\tau_i - f_i(Dec(z)), 0\}}_{\text{property validation loss (to be minimized)}} - \quad (1)$$

$$\underbrace{\sum_{j=1}^{J} \lambda_j \cdot g_j(Dec(z)|S)}_{\text{moluecular score (to be maximized)}}$$

The first term $$\sum_{i=1}^{I} \max\{\tau_i - f_i(Dec(z)),\}$$

quantifies the loss of property constraints and is presented as the sum of hinge loss over all property predictions, which approximates the binary property validation relative to the required thresholds $\{\tau_i\}_{i=1}^{I}$. It achieves the optimal value (i.e., 0) only when the candidate sequence x=Dec(z) satisfies all the desired properties, which is equivalent to the condition that $f_i(Dec(z)) \geq \tau_i$ for all $i \in [I]$.

The second term $$\sum_{j=1}^{J} \lambda_j \cdot g_j(Dec(z)|S)$$

corresponds to a set of molecular similarity scores to be maximized (therefore a minus sign in the minimization formulation). The reference sequence set S can be the starting sequence such that $S=\{x_0\}$, or a molecule database of interest. The positive coefficients $\{\lambda_j\}_{j=1}^{J}$ are associated with the set of molecular similarity scores $\{g_j(Dec(z)|S)\}_{j=1}^{J}$, respectively. The use of the latent representation z as the optimization variable in a low-dimensional continuous space greatly facilitates the original MO problem in a high-dimensional discrete space. The optimization variable z can be initialized as the latent representation of $x_0$, denoted by $z_0=Enc(x_0)$.

Similarly, for Case (ii), the designed loss function 250 representing the optimization problem is formulated according to equation (2) as follows:

$$\text{Minimize}_{z\in\mathbb{R}^d} \underbrace{\sum_{j=1}^{J} \max\{g_j(Dec(z)|S), -\eta_j, 0\}}_{\text{molecular constraint loss (to be minimized)}} - \quad (2)$$

$$\underbrace{\sum_{i=1}^{I} \gamma_i \cdot f_i(Dec(z))}_{\text{property score (to be maximized)}}$$

where $\{\gamma_i\}_{i=1}^{I}$ are positive coefficients of the property scores $\{f_i(Dec(z))\}_{i=1}^{I}$, respectively.

FIG. 2 shows a further step 260 of performing the molecular optimization according to one or more of the two practical cases in MO: (i) optimizing molecular similarity while satisfying desired chemical properties and (ii) optimizing chemical properties with similarity constraints. In an embodiment, framework 200 performs a pseudo-gradient estimation of a loss function, and a pseudo-gradient descent technique that alternately, can include using an Adam update. In particular, based on the input stream z representing a candidate modified molecule, the black-box predictor model performs evaluations for one or more desired properties. The output property evaluations are mapped to the loss function 250 designed to determine how far away from the desired features the candidate modified molecule is. Then an optimization technique 260 using the loss function values 255 to inform the further optimization of the molecule by modifying the vector stream z in the latent space such that the desired properties can be improved (i.e., achieve better property prediction). In an embodiment, random perturbation(s) is(are) added to vector stream z and nearby loss function changes are observed. That is, in an iterative process described herein with respect to FIGS. 4A, 4B and 5, the loss landscape is explored around vector stream z to determine a direction that can be used to improve z such that the loss function decreases and properties improve. The iterative process evaluates each new vector stream z, performs evaluations, performs random perturbations (the perturbation including neighboring data points of z) and uses that perturbed sequence for molecule optimization. As an example, there may be a quantity of 50 perturbations used to evaluate a loss function at a particular latent vector z although more or less perturbations can be used. The process iterates the modifying of z until the specified properties have been met.

In an embodiment, in contrast to first-order (i.e., gradient-based) optimization, the method performs a zeroth-order (ZO) optimization 260 that uses loss function values 250 evaluated at queried data points to approximate the gradient and perform gradient descent, which is referred to herein as pseudo gradient descent. This technique is used in machine learning tasks when the function values are observable, while the gradient and other higher-order information are either infeasible to obtain or difficult to compute. A major benefit of ZO optimization is its adaptivity from gradient-based methods. Despite using gradient estimates, many ZO optimization algorithms enjoy the same iteration complexity to converge to a stationary solution as their first-order counterparts under similar conditions. However, an additional multiplicative cost in a polynomial order of the problem dimension d (usually O(d) or O($\sqrt{d}$)) will appear in the rate of convergence, due to the nature of query-driven pseudo gradient descent. Examples of ZO optimization algorithms with provable convergence guarantees include ZO stochastic gradient descent (ZO-SGD), ZO stochastic variance-reduced method, ZO adaptive momentum method, and ZO online alternating direction method of multipliers.

In an embodiment, the solving of the optimization problem at step 260 implements an iterative process such that QO algorithm returns a set of found solutions. When performing the zeroth-order estimation in solving MO use case (i) corresponding to equation (1) to optimize molecular similarity while satisfying desired chemical properties, an iterate $z^{(t)}$ is considered as a valid solution if its decoded sequence satisfies the thresholds for the property conditions of all the predicted models, where t is the iteration step. Similarly, when performing the zeroth-order estimation in solving MO use case (ii) corresponding to equation (2) to optimize chemical properties with similarity constraints, a valid solution $z^{(t)}$ means the set of separate constraint thresholds imposed for molecular similarity are satisfied for all constraints.

Figures 4A, 4B:
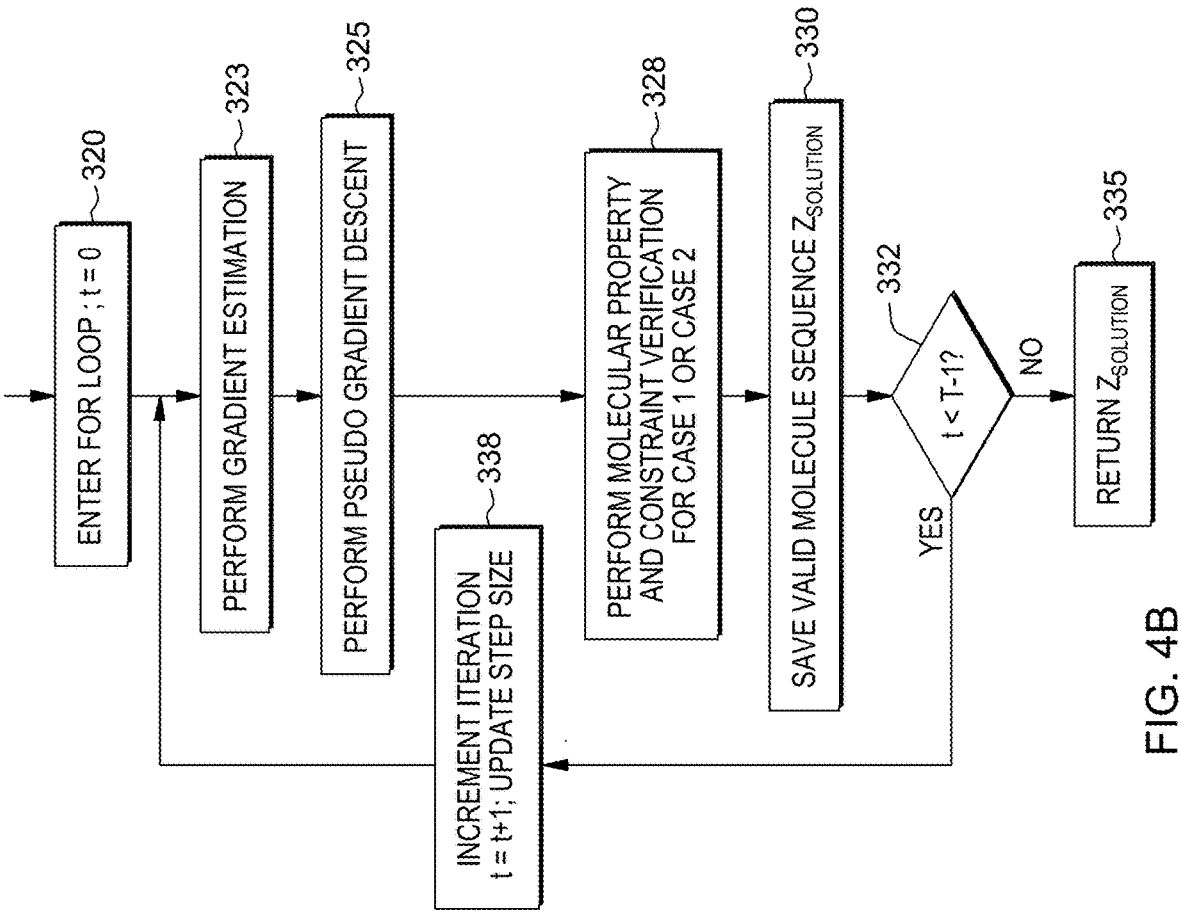
FIGS. 4A-4B illustrate details of an exemplary method for a generic end-to-end query-based molecular optimization for drug discovery.

FIG. 4A shows an exemplary method 300 for a generic end-to-end query-based molecular optimization (QMO) for drug discovery. As shown in FIG. 4A, at 302, in a first embodiment, there is first input to the system the Trained Encoder-Decoder plug-in 170. Then, at 305, the system receives as input the molecular property predictors $\{f_i\}_{i=1}^{I}$ and thresholds $\{\tau_i\}_{i=1}^{I}$. At 308, the system receives as input the Molecular similarity metrics $\{g_j\}_{j=1}^{J}$ and thresholds $\{\eta_j\}_{j=1}^{J}$. Further input to the system at 310 is a total search iteration T; a step size $\{\alpha_t\}_{t=0}^{T-1}$ for use in the pseudo gradient descent technique; a starting molecule sequence $x_0$; a reference sequence set S; and a Loss function, i.e., the objective function to be minimized as defined herein by equations (1) and (2). Continuing to 315, there is performed an initialization step to initialize the initial latent representation, i.e., $z^{(0)} = Enc(x_0)$ and initialize the solution: $Z_{solution} \leftarrow \{\emptyset\}$.

The method continues to step 320, FIG. 4B where an iterative FOR or WHILE loop is entered with the iterations governed by t=0, 1, ..., T−1. It is noted that while MO is formulated as an unconstrained continuous minimization problem, the method depicted in FIG. 4B performs a zeroth order optimization to provide a generic and model-agnostic approach for solving the problem formulation in equation (1) using only inference results of $\{f_i\}_{i=1}^I$ and $\{g_j\}_{j=1}^J$ on queried sequences.

That is, at 323, there is performed, for the current iteration t and step size, estimating the gradient using a zeroth order optimization using a gradient estimator loss function $\hat{\nabla}\text{Loss}(z^{(t)})$ defined according to equation (4).

At step 325, letting Loss(z) denote the objective function to be minimized as defined in either equations (1) or (2), the QMO framework uses zeroth order gradient descent to find a solution, which mimics the descent steps in gradient-based solvers but only uses the function values Loss(•) of queried sequences. Specifically, continuing at 325, FIG. 4B, at the t-th iteration of the zeroth order optimization process, the iterate $z^{(t+1)}$ is updated by performing a Pseudo gradient descent estimation according to equation (3) as follows:

$$z^{(t+1)} = z^{(t)} - \alpha_t \hat{\nabla}\text{Loss}(z^{(t)}) \quad (3)$$

where $\alpha_t$ is the step size at the t-th iteration, and the true gradient $\nabla\text{Loss}(z^{(t)})$ (which is challenging or infeasible to compute) is approximated by the pseudo gradient $\hat{\nabla}\text{Loss}(z^{(t)})$. The pseudo gradient $\hat{\nabla}\text{Loss}(z^{(t)})$ is estimated by Q independent random directional queries defined according to equation (4) as:

$$\hat{\nabla}\text{Loss}(z^{(t)}) = \frac{d}{\beta \cdot Q} \sum_{q=1}^{Q} \left[ \text{Loss}(z^{(t)} + \beta u^{(q)}) - \text{Loss}(z^{(t)}) \right] \cdot u^{(q)}$$

where d is the dimension of the latent space of the encoder-decoder used in QMO, and $\beta > 0$ is a smoothing parameter used to perturb $z^{(t)}$ with Q random directions $\{u^{(q)}\}_{q=1}^{Q}$ that are independently and identically sampled on a d-dimensional unit sphere. In one embodiment, the $\{u^{(q)}\}_{q=1}^{Q}$ is sampled using a zero-mean d-dimensional isotropic Gaussian random vector divided by its Euclidean norm, such that the resulting samples are drawn uniformly from the unit sphere. Intuitively, the gradient estimator in equation (4) is viewed as an average of Q random directional derivatives along the sampled directions $\{u^{(q)}\}_{q=1}^{Q}$. The constant $$\frac{d}{\beta \cdot Q}$$

in equation (4) solved at step 323 in FIG. 4B ensures the norm of the estimated gradient is at the same order as that of the true gradient.

Then, continuing at 328, there is performed procedures for molecular property and constraint verification whether by solving the optimization problem according to equation (1) and/or equation (2). Based on the iterative optimization step in equation (3), the QMO method only uses function values queried at the original and perturbed sequences for optimization. The query counts made on the Loss function for computing $\hat{\nabla}\text{Loss}(z^{(t)})$ is Q+1 per iteration. Larger Q further reduces the gradient estimation error at the price of increased query complexity. When solving equation (1), an iterate $z^{(t)}$ is considered as a valid solution if its decoded sequence $\text{Dec}(z^{(t)})$ satisfies the property conditions $f_i(\text{Dec}(z^t)) \geq \tau_i$ for all $i \in [I]$. Similarly, when solving equation (2), a valid solution $z^{(t)}$ means $g_j(\text{Dec}(z)|S), -\eta_j$ for all $j \in [J]$.

That is, at 328, FIG. 4B, at the current iteration t, upon solving loss function optimization equation (1), the method checks for whether $f_i(\text{Dec}(z^t)) \geq \tau_i$ for all $i \in [I]$, then at 330 the method saves the valid molecule sequence $Z_{solution} \leftarrow Z_{solution} \cup \{z^{(t)}\}$. Alternatively, or in addition, for the current iteration t, upon solving equation (2) in which case the method checks for whether $g_j(\text{Dec}(z^{(t)})|S) \leq \eta_j$ for all $j \in [J]$, then at 330 the method saves the valid molecule sequence $Z_{solution} \leftarrow Z_{solution} \cup \{z^{(t)}\}$. At 332, the method determines whether the total number of iterations has been reached, i.e., whether t=T−1, and if not, the method proceeds to step 338 where the step t is incremented and returns to step 323 to repeat MO processing steps 323-332 using the updated iterate $z^{(t)}$. In an embodiment, the step size $\alpha_t$ is additionally updated. Otherwise, at 332, if it is determined that t=T−1, at 335 the method returns the valid molecule sequence $Z_{solution}$. That is the QMO method returns a set of found solutions or returns a null if no solution is found for the current sequence iterate.

In the QMO framework depicted in method 300 of FIGS. 4A, 4B, it is noted that, inherited from zero order optimization, QMO has algorithmic convergence guarantees. Under mild conditions on the true gradient (e.g., Lipschitz continuous and bounded gradient), the zeroth order gradient descent following equation (3) ensures QMO takes at most $$O\left(\frac{d}{T}\right)$$

iterations to be sufficiently close to a local optimum in the loss landscape for a non-convex objective function, where T is the number of iterations. In addition to the standard zeroth order gradient descent method, the QMO method can naturally adopt different zeroth order solvers, such as zeroth order stochastic and accelerated gradient descent.

Figure 5:
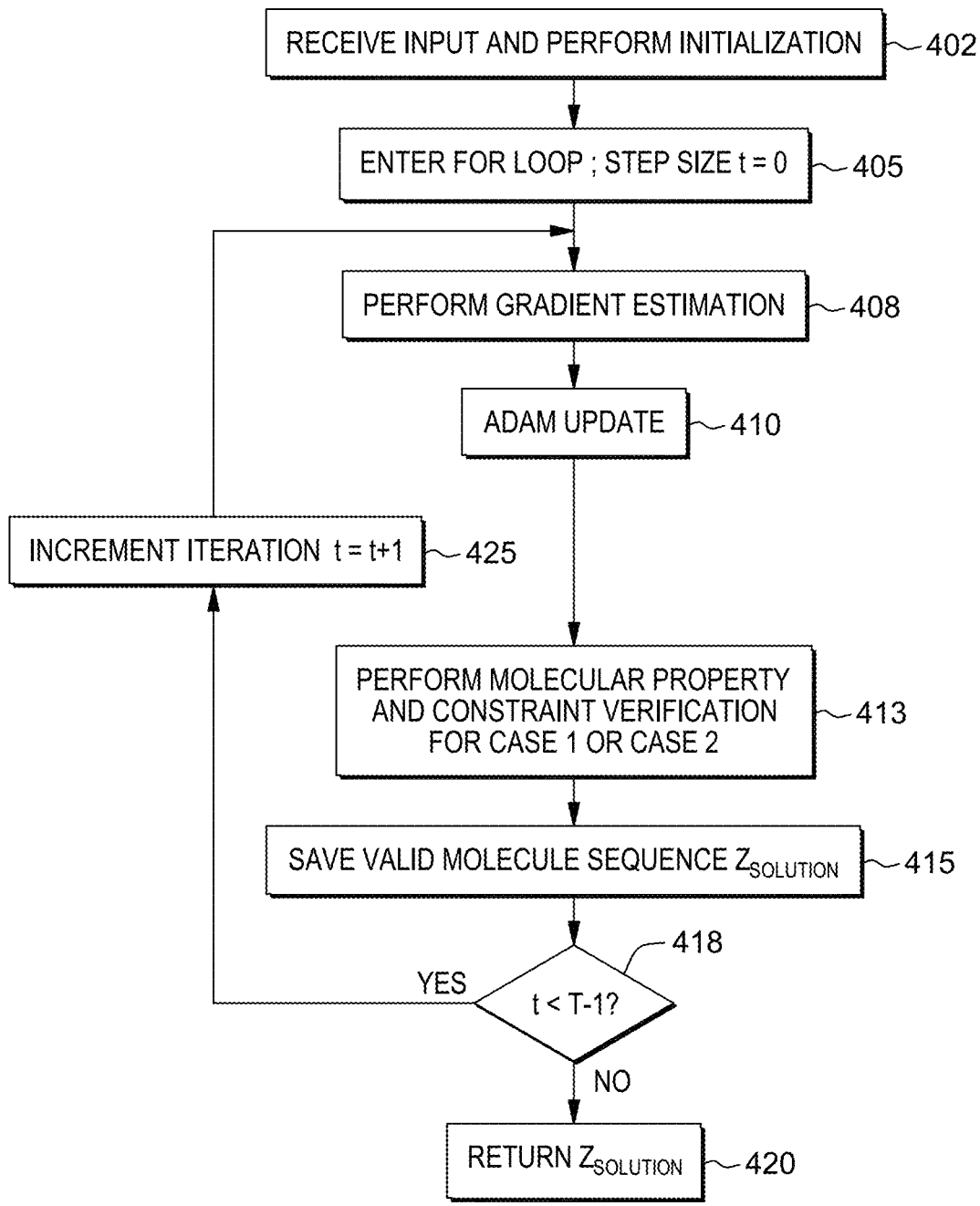
FIG. 5 illustrate details of an alternative to method of FIG. 4B that includes an Adam update for zeroth-order gradient descent computation in the QMO framework.

In an alternate embodiment, the method depicted in FIGS. 4A, 4B is modified to obtain an Adam-type optimizer implementing a zeroth-order optimization method 400 as shown in FIG. 5. In particular, the modified method employing Adam-type optimizer includes input and initialization step 402 corresponding to each of the initialization steps depicted in FIG. 4A for receiving as inputs the trained Encoder-Decoder, molecular property predictors and thresholds, the molecular similarity metrics and thresholds, total search iteration limit T, an initial step size $\alpha_0$, the starting molecule sequence $x_0$, the reference sequence set S, and Loss function. Further besides initializing $z^{(0)} = Enc(x_0)$ and $Z_{solution} \leftarrow \{\emptyset\}$, at 402, there are further initialized Adam update variables $m^{(0)}, v^{(0)} \leftarrow 0$; $B_1 \leftarrow 0.9$; and $B_2 \leftarrow 0.999$ for use in adapting the step size.

Further, as shown in FIG. 5, steps 405, 408, 413, 415, 418, 420, 425 correspond to the steps 320, 323, 328, 330, 332, 335, 338 of FIG. 4B, however prior to performing the molecular property and constraint verification for Case 1 or Case 2, step 410 alternatively performs the in the QMO optimization an Adam optimizer update by computing the following:

$$m^{(t+1)} = B_1 \cdot m^{(t)} + (1 - B_1) \cdot \hat{\nabla} \text{Loss}(z^{(t)})$$

$$v^{(t+1)} = B_2 \cdot v^{(t)} + (1 - B_2) \cdot \hat{\nabla} \text{Loss}(z^{(t)})^2$$

$$\hat{m}^{(t+1)} = m^{(t+1)} / (1 - (B_1)^{t+1})$$

$$\hat{v}^{(t+1)} = v^{(t+1)} / (1 - (B_2)^{t+1})$$

$$z^{(t+1)} = z^{(t)} - \alpha_0 \cdot \frac{\hat{m}^{(t+1)}}{\sqrt{\hat{v}^{(t+1)} + \epsilon}}$$

where $\epsilon$ is a constant value needed for numerical stability, i.e., to prevent from the denominator being 0. The method of FIG. 5 depicting the zeroth-order version of the Adam optimizer that automatically adapts the step sizes with an initial learning rate $\alpha_0$ was used to demonstrate the performance of the QMO framework 200 on three sets of tasks that aim to optimize molecular properties with constraints. In one QMO framework embodiment, there are specified experimental settings, data descriptions, and QMO hyperparameters for each task. In all settings, QMO hyperparameters can be tuned to a narrow range and then all the reported combinations can be tried for each starting sequence. Among all feasible solutions returned by QMO, the one having the best molecular score given the required constraints can be reported.

Drug Discovery for COVID-19

In one embodiment, to provide a timely solution and accelerate the drug discovery against a new virus such as SARS-CoV-2, known drugs are optimized to facilitate design and production. One task focuses on optimizing the parent molecule structure of a set of existing drugs. Specifically, the embodiment uses the QMO formulation according to equation (1), the pre-trained binding affinity predictor $f_{affinity}$ (output is pIC50 value), and a "Tanimoto" similarity $g_{Tanimoto}$ (i.e., ranging from 0 to 1) over Morgan fingerprints between the original and optimized molecules. In the embodiment, given a known drug $x_0$, there is found an optimized molecule x such that $f_{affinity}(x) \geq \tau_{affinity}$ while $g_{Tanimoto}(x|x_0)$ is maximized. In the embodiment, the QMO implementation used a pre-trained encoder-decoder having the latent dimension d=512. The hyperparameters were Q=10, T=2000, $\beta$={10, 25}, $\alpha_0$={0.1, 0.05} and $\lambda_{Tanimoto}$={1, 10}.

SARS-CoV-2 Use Case

For this use case task demonstration, there was assembled 24 existing drugs shown to have weak to moderate affinity with SARS-CoV-2 Mpro. These are generally in the μM range of IC50, a measure of inhibitory potency. FIG. 6 shows a table 500 including the experimental IC50 values for a few of the COVID-19 drug candidates examined in the demonstration as compared with their predicted affinity values. In particular table 500 of FIG. 6 shows experimental IC50 values that have been converted to pIC50 for comparison. Affinity predictions are $pIC50 = -\log_{10}(IC50)$. The results shown in FIG. 6 indicate that the predicted pIC50 values 502 are close to the corresponding experimental values 501.

In the demonstration, a target affinity threshold $\tau_{affinity}$ was chosen as pIC50≥7:5, which implies strong affinity. The QMO optimization results of each drug compound are summarized in table 550 depicted in FIG. 7 which table reports the original (orig.) and improved (imp.) values and their similarity for the following properties: affinity predictions 555, Tanimoto similarity 560, quantitative estimation of drug likeness (QED) 565, synthetic accessibility (SA) 570, and the logarithm of partition coefficient (log P) properties 575. In table 550 of FIG. 7, the results show that predicted affinity is improved past the threshold for every starting compound 551 while attaining similarity of 0.58 on average. QED is unchanged, on average, showing QMO preserves drug-likeness. SA increases only slightly indicating synthesizability is still reasonable. Hydrophobicity (log P) decreases slightly meaning the molecules are more water-soluble.

Table 550 of FIG. 7 further shows a docking column 580 depicting the results of blind docking simulation with $M^{pro}$ (e.g., low is better). That is, in an embodiment, there were run blind molecular docking simulations using AutoDock Vina over the entire structure of $M^{pro}$ and the lowest binding free energy over 5 runs were used for further analysis, as obtained with its parameter exhaustiveness=8. Because binding free energy is only moderately correlated with drug effectiveness, the results are categorized into low and high energy configurations where low is defined as ≤−6 kcal/mol (lower is better).

Taking the COVID-19 and the SARS-CoV-2 virus as a non-limiting illustrative example, the QMO framework is used to improve binding affinity of a number of existing drugs to the SARS-CoV-2 main protease (Mpro) sequence. As illustrated in FIGS. 1A-1C, this task was formulated as an optimization over predicted binding affinity (obtained using a pre-trained machine learning model) starting from an existing drug of interest, such as identified from the literature. Binding affinity (pIC50=−log 10(IC50)) of the resulting molecule is constrained to be above 7.5, a sign of good affinity, while a chemical similarity measure, e.g., the Tanimoto similarity between the resulting and the original molecule, is maximized. In particular, FIGS. 1A-1C show the binding results of the drug compound Lopinavir 50 and its QMO-optimized molecule 52. In particular, FIG. 1A depicts a binding of the molecule Lopinavir 50 with SARS-CoV-2 $M^{pro}$ and FIG. 1B depicts its QMO-optimized variant molecule 52 binding with SARS-CoV-2 $M^{pro}$, as obtained using docking simulations for validation. FIG. 1C depicts each of their respective 2D structures 60, 62. Using QMO, the predicted affinity for the Lopinavir variant was optimized from 6.22 to 8.31, while maintaining a Tanimoto similarity score of 0.78 and without changing the binding pocket significantly. The simulation results shown in Table 550 of FIG. 7 show most molecules with low binding energy still bind favorably after improvement.

Benchmarks on QED and Penalized Log P

Given a similarity constraint, finding an optimized molecule that maximizes drug-likeness of compounds using the QED score (i.e., ranging from 0 to 1) or improves penalized log P scores, are two widely used benchmarks. For a pair of original and optimized sequences ($x_0$, x), the QMO formulation used in equation (2) with the Tanimoto similarity as $g_{Tanimoto}(x|x_0)$ and the interested property score (QED or penalized log P) as fscore(x). Following the same setting as existing works, the threshold $\delta$ for $g_{Tanimoto}(x|x_0)$ is set as either 0.4 or 0.6. In an embodiment, the RDKit open source toolkit for cheminformatics (http://www.rdkit.org) is used to compute QED and log P, and MOSES (i.e., MOlecular SEtS benchmarking platform supporting research on machine learning for drug discovery) is used to compute SA (synthetic accessibility), where $f_{penalized\ log\ P}(X) = \log P(x) - SA(x)$. For the penalized log P task, these hyperparameters were used: Q=100, $\beta$=10, $\alpha_0$=2.5, $\gamma_{penalized\ log\ P}$=0.04, and T=80. For the QED task, there was used Q=50, $\beta$=10, $\alpha_0$=0.05, $\gamma_{QED}$=4, T=20, and the best results among 50 restarts were reported.

It was found that for the QED task, using multiple restarts can further improve the performance. In the experiments as demonstrated, the same set of 800 low-penalized log P molecules were used and 800 molecules with QED$\in$[0.7, 0.8] chosen from the ZINC test set (available from the public access database and benchmarking tool set at http://zinc15.docking.org) as the starting sequences.

Comparisons of QMO with various guided-search and translation-based models are shown in FIGS. 8 and 9. In particular, FIG. 8 shows a Table 600 depicting performance of drug likeness (QED) task with Tanimoto similarity constraint of $\delta$=0.4. For the QED task, the success rate 602 defined as the percentage of improved molecules having similarity greater than $\delta$=0.4 is shown in Table 600 (FIG. 8). As shown, the result 605 using QMO outperforms all corresponding baseline results 602 obtained using other methods 601 by at least 15%.

Further, FIG. 9 shows a Table 650 depicting performance improvement of penalized log P task at various Tanimoto similarity constraint values $\delta$ as compared to results 652 obtained using other methods 651. For penalized log P, there is no reason to continue optimizing past 80 iterations as penalized log P can be increased almost arbitrarily without making the resulting molecule more useful for drug discovery. For example, when T=80, the molecules optimized by QMO outperform 655 the corresponding obtained baseline results by a significant margin as shown in Table 650 (FIG. 9). The increased standard deviation in QMO is an artifact of having some molecules with much improved penalized log P scores.

Optimization of Antimicrobial Peptides (AMPs) for Improved Toxicity

As an additional motivating QMO framework use-case, discovering new antibiotics at a rapid speed is critical to tackling a looming crisis of a global increase in antimicrobial resistance. AMPs are considered as promising candidates for next generation antibiotics. Optimal AMP design requires balancing between multiple, tightly interacting attribute objectives, such as high potency and low toxicity. In an embodiment, the QMO framework is used to find improved AMPs with lower toxicity and high sequence similarity to known AMPs with reported/predicted toxicity.

Using the QMO formulation according to equation (1), the pre-trained predictor for toxicity ($f_{tox}$) and the negative of the Expect value (E-value) from the NCBI BLASTP tool (at https://blast.ncbi.nlm.nih.gov/) is used as the similarity score ($g_{BLAST}$) to be maximized. As known, the Basic Local Alignment Search Tool (BLAST) provides biological sequence (e.g., nucleotide, protein sequences, etc.) similarity (or homology) search and alignment score computation between the query sequence and sequences from a database and calculates a statistical significance. The E-value of a query sequence x and the original sequence $x_0$ is used. Lower E-value means higher similarity (e.g., 0 means perfect match). In the QMO implementation, there is used a pre-trained encoder-decoder (having the latent dimension d=100). The QMO parameters are Q=50, $\beta$=1, $\alpha_0$=1, $\lambda_{BLAST}$=10$^9$, and T=5000. The property constraint is set as $f_{tox}(x) \leq 0.1529$. Binary classification on this threshold gives 93.7% accuracy for toxicity prediction on a large peptide database.

Figures 10, 11:
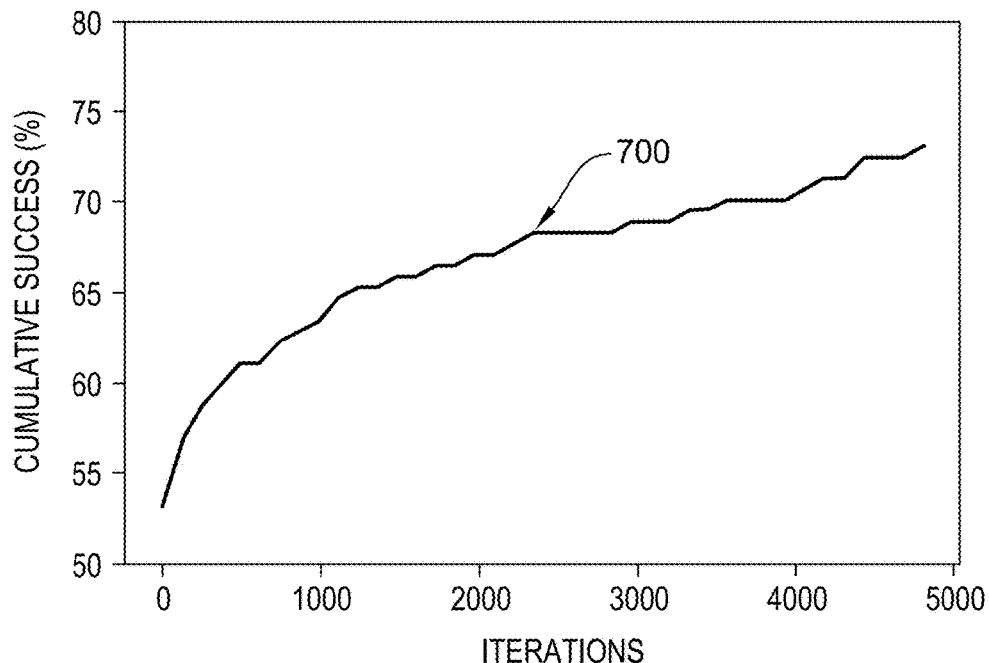
FIG. 10 depicts a plot showing a cumulative success rate of experimentally-verified toxic AMP sequences up to the t-th iteration using QMO.
FIG. 11 depicts a table showing examples of validated hemolytic toxicity performed with HLPpred-Fuse tool that predicts for a given peptide sequence, HLPs activity and probability.

In experiments conducted, 167 experimentally-verified toxic AMPs were used as starting sequences. FIG. 10 depicts a plot 700 showing their cumulative success rate (Y-axis) using QMO up to the t-th iteration (x-axis). Within the first few iterations, more than 53% molecules were successfully optimized. Eventually, about 73% (i.e., 122/167) molecules were successfully optimized. The average E-value of first-found success via QMO (0.0108) is already comparable to the average pairwise E-value of all starting sequences (0.011), suggesting good initialization in guided search. The average predicted toxicity of the 122 resulting sequences drops from 0.9689 (original) to 0.0258 after optimization. QMO can further improve similarity and maintain low predicted toxicity below the threshold after first success. The results also show high consistency with two independent external analysis. The predictions from iAMP (using a two-layer multi-layer prediction framework) and ToxinPred (using models based on machine learning technique and quantitative matrix using various properties of peptides for predicting toxicity of peptides) show that 67.48% (i.e., 83/122) QMO-optimized molecules are non-toxic AMPs.

As shown in FIG. 11, table 750 shows some examples of validated hemolytic toxicity performed with HLPpred-Fuse tool that predicts for a given peptide sequence, HLPs activity and probability values (http://thegleelab.org/HLPpred-Fuse/). In particular, FIG. 11 depicts a Table 750 including a column 760 including external validations of hemolytic toxicity (HLP) performed with HLPpred-Fuse and a column 770 indicating corresponding indicated toxicities (e.g., Yes/No).

SARS-Cov-2 Use Case

Figure 12C:
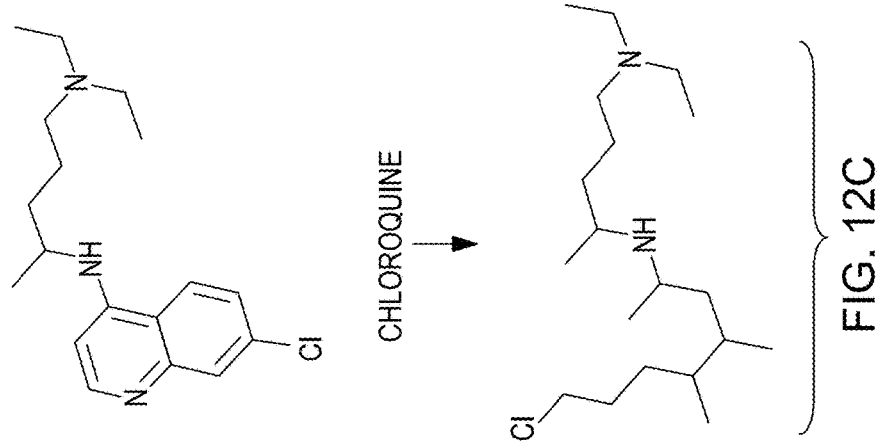
FIGS. 12A-12X depict comparisons of the original and improved versions of 24 COVID-19 drug candidates obtained using QMO in a SARS-CoV-2 use case demonstration.
Figure 12B:
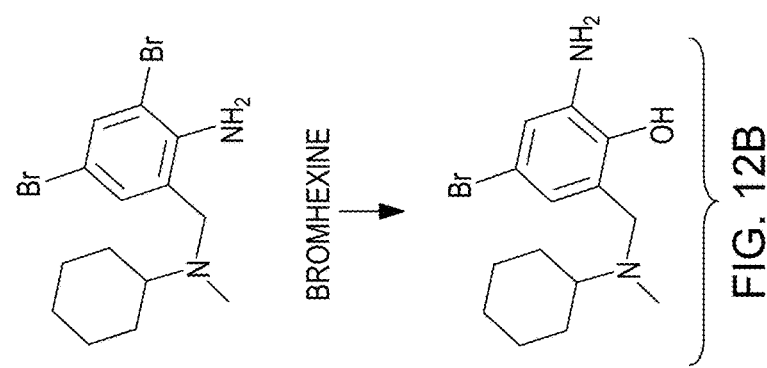
Figure 12A:
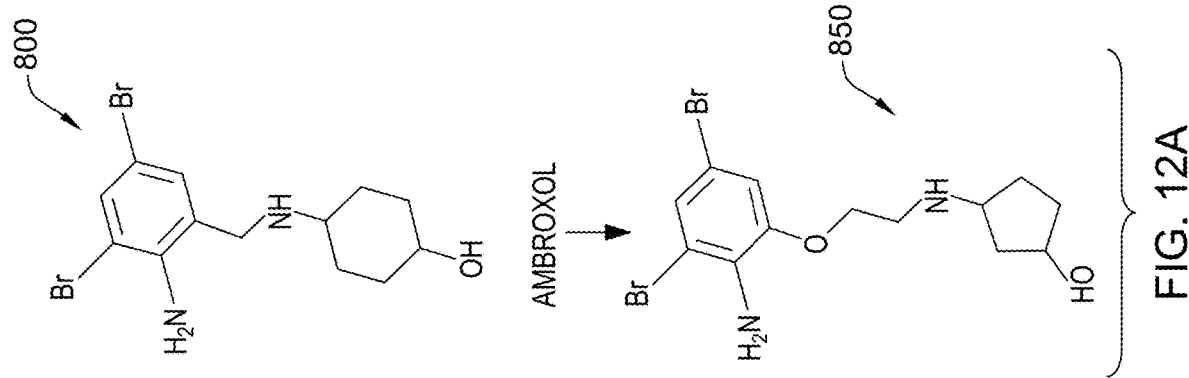
Figure 12E:
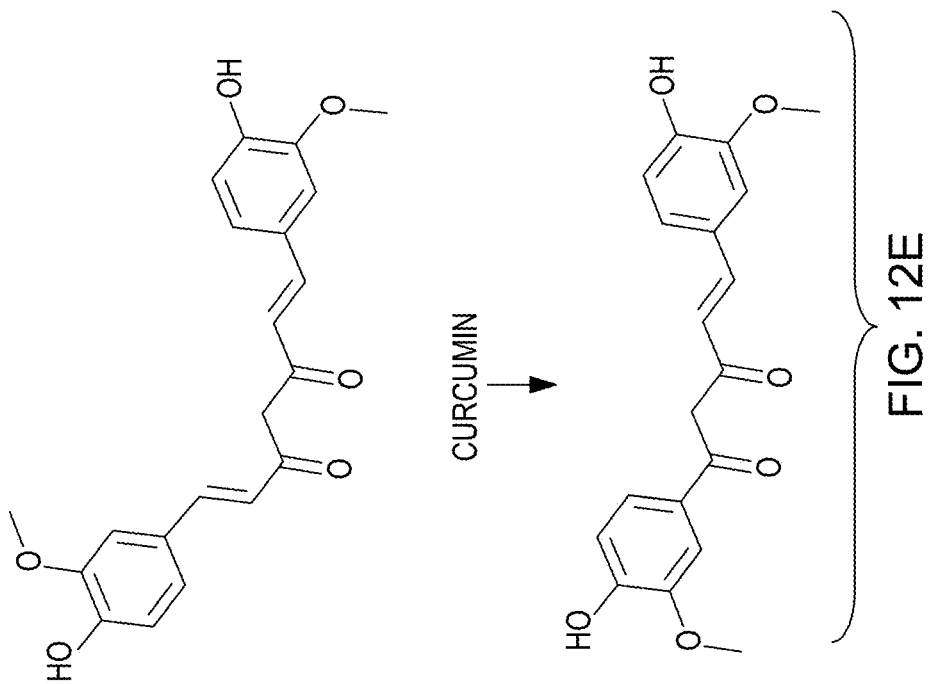
Figure 12D:
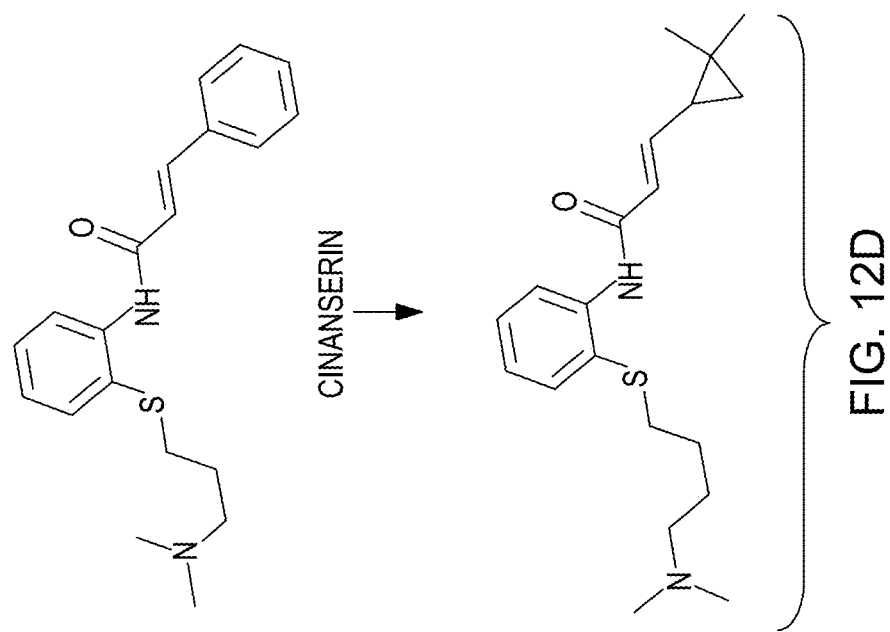
Figure 12H:
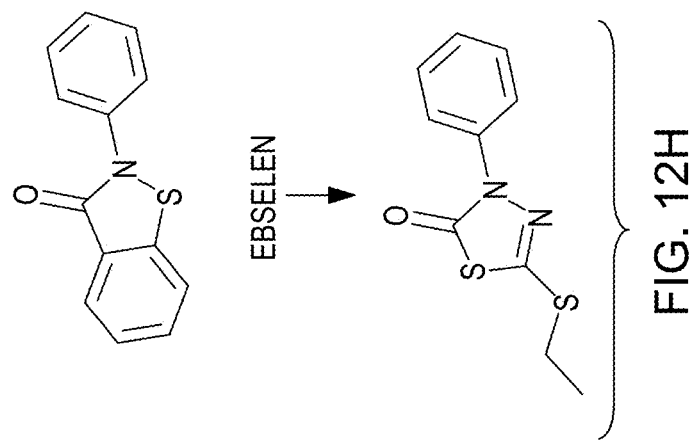
Figure 12G:
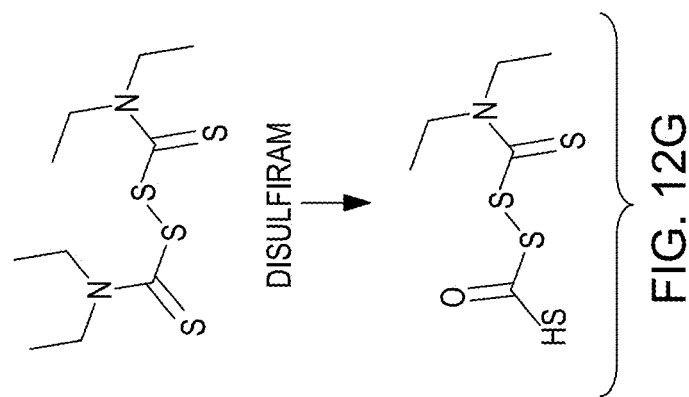
Figure 12F:
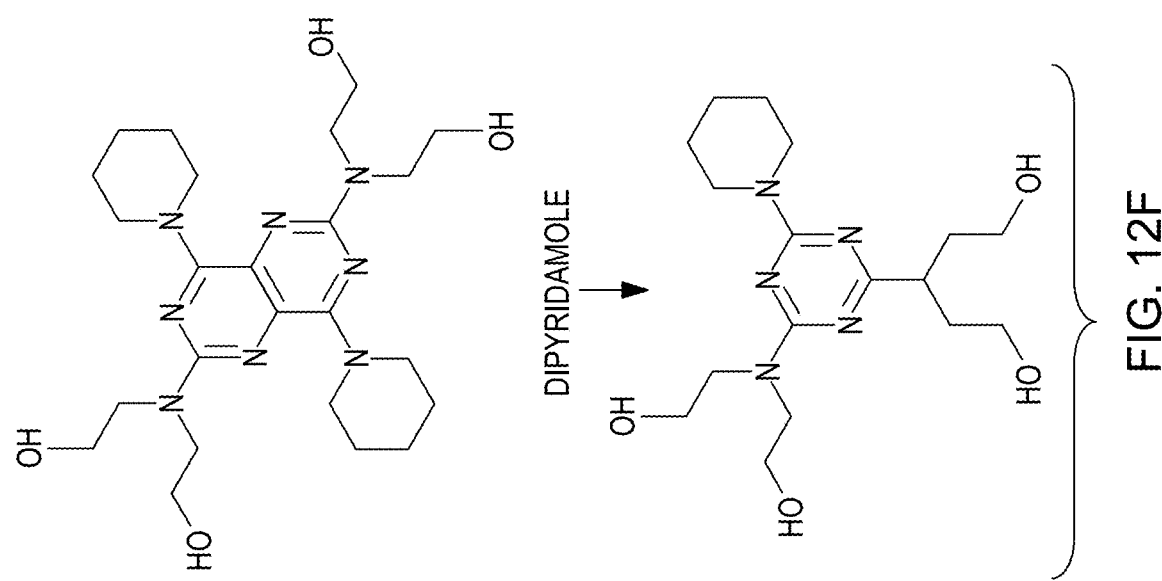
Figure 12K:
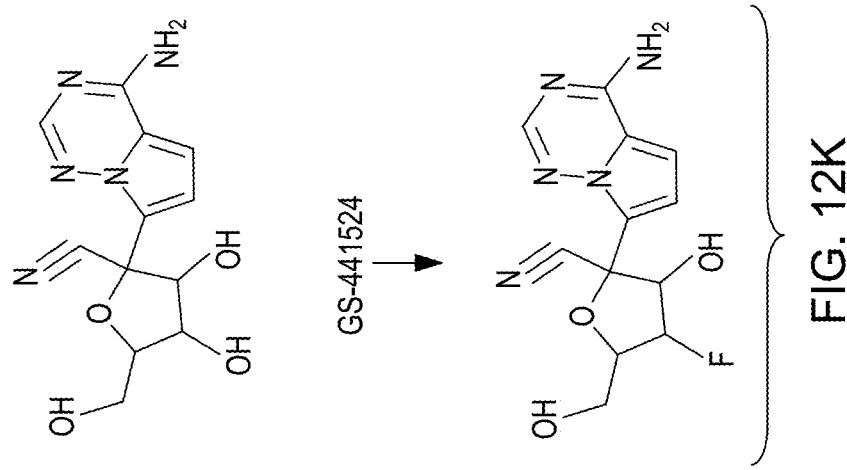
Figure 12J:
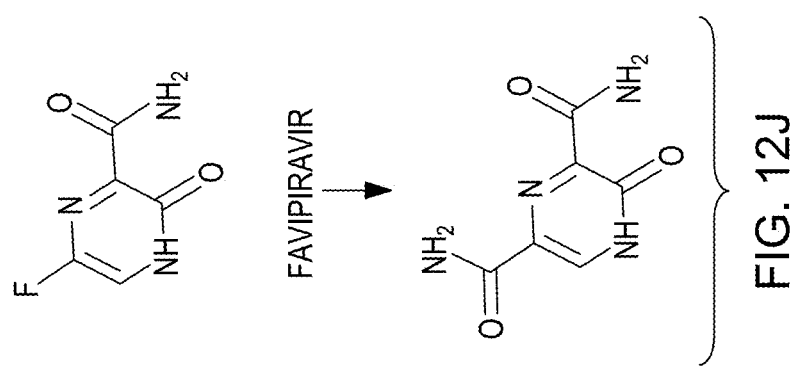
Figure 12I:
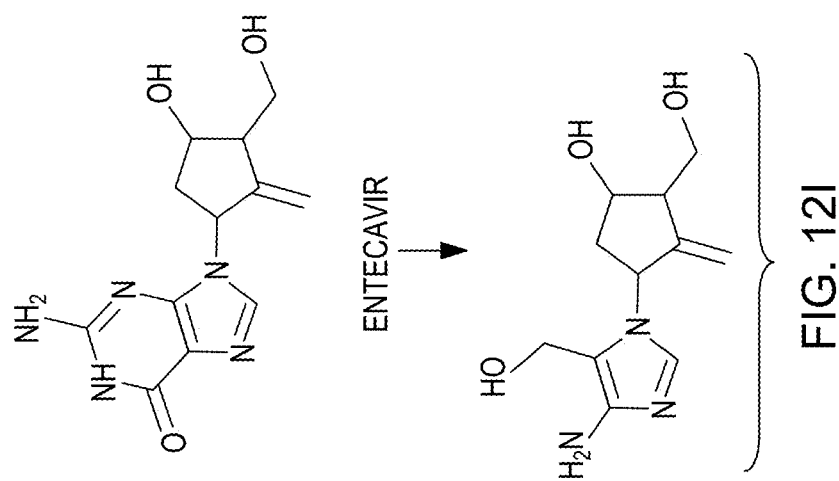
Figure 12N:
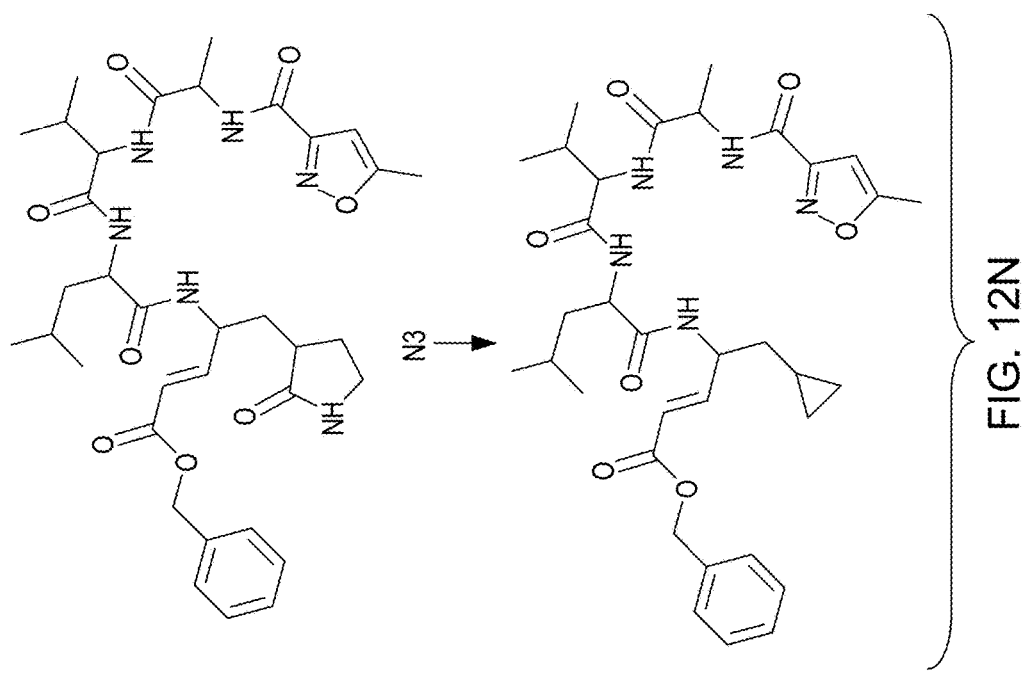
Figure 12M:
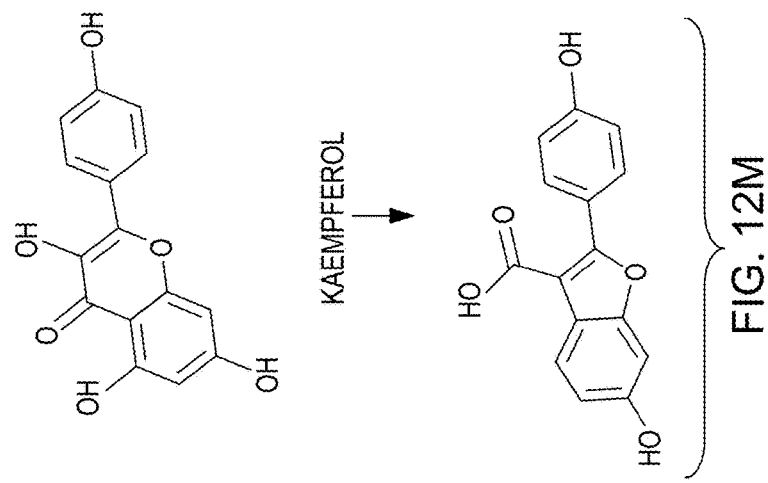
Figure 12L:
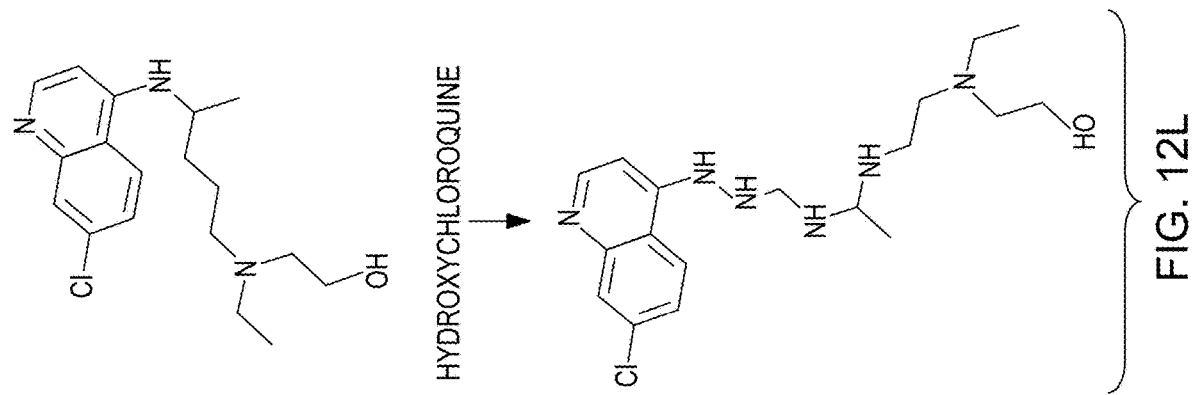
Figure 12Q:
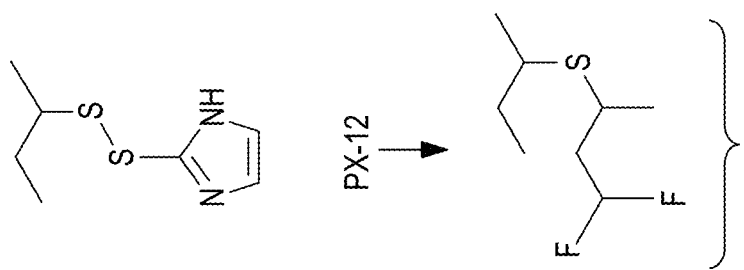
Figure 12P:
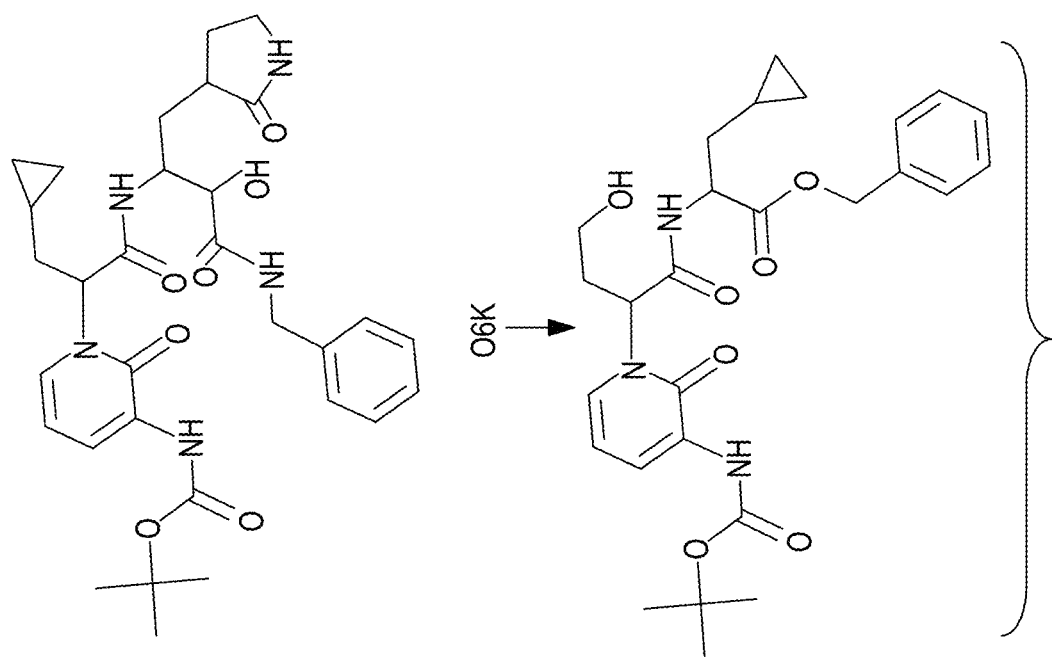
Figure 12O:
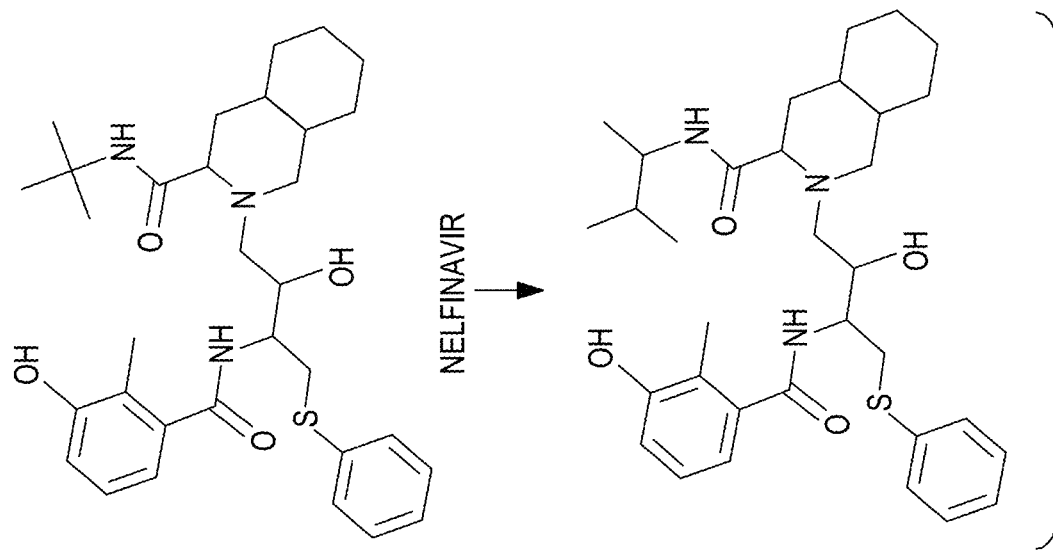
Figure 12T:
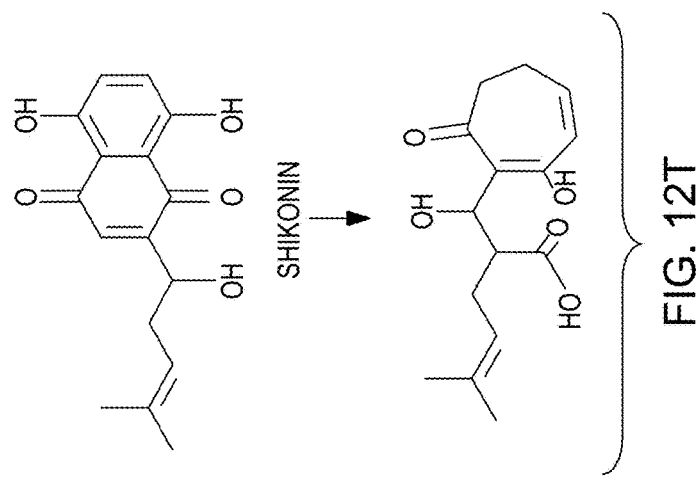
Figure 12S:
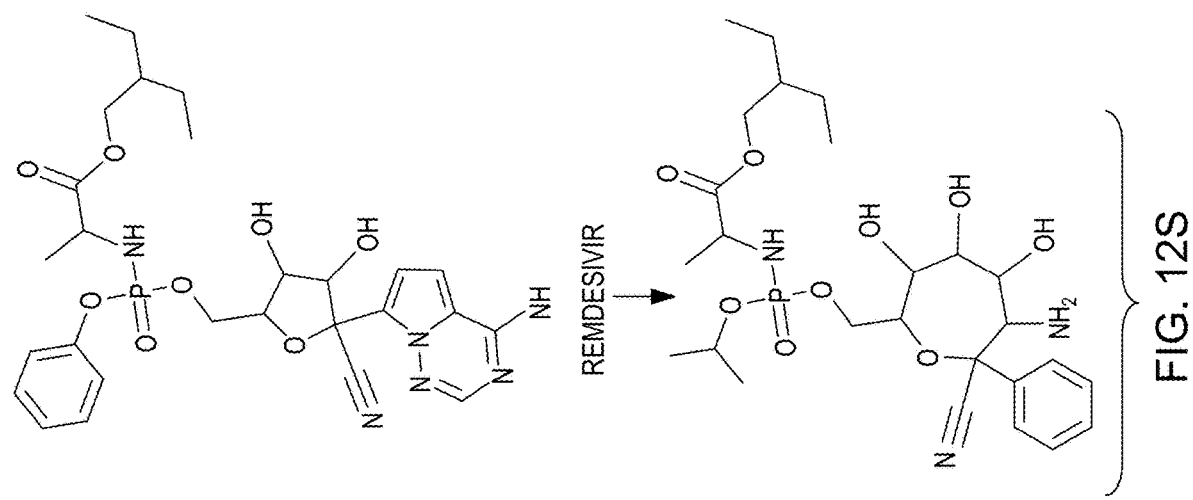
Figure 12R:
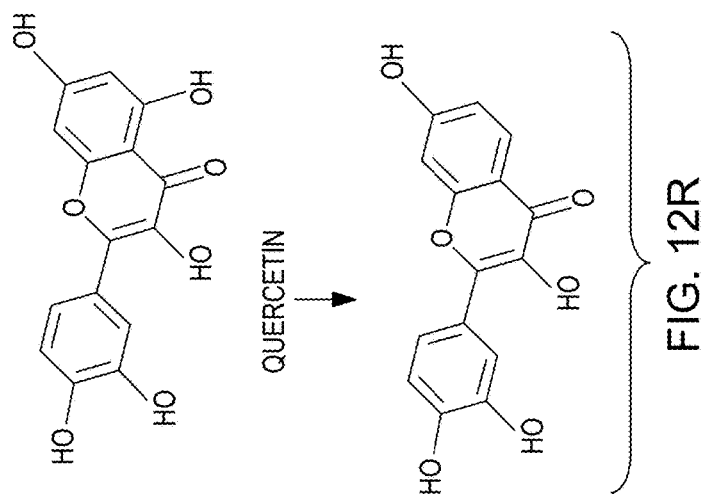
Figure 12V:
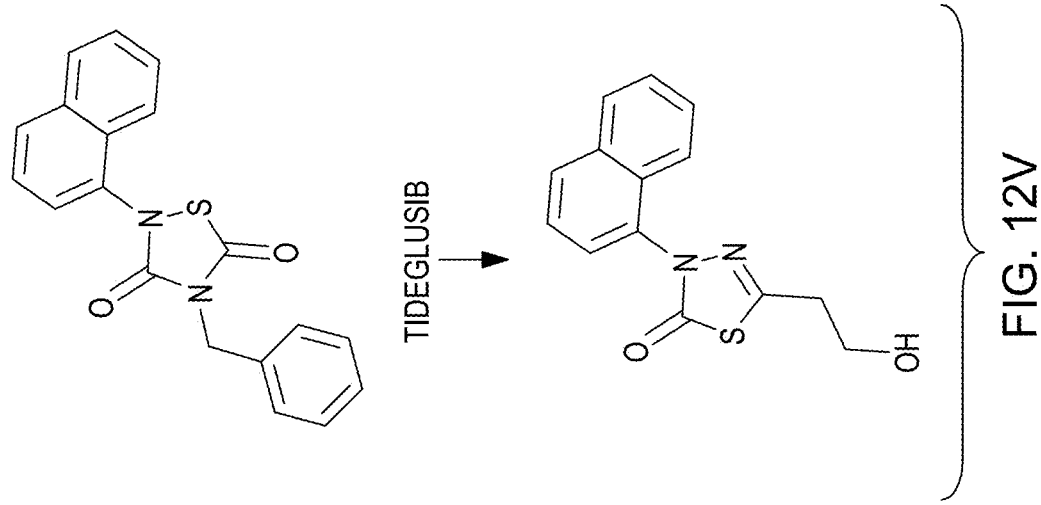
Figure 12U:
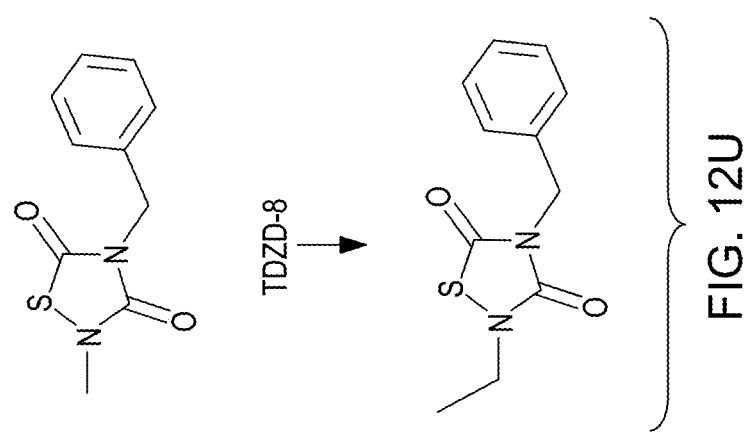
Figure 12X:
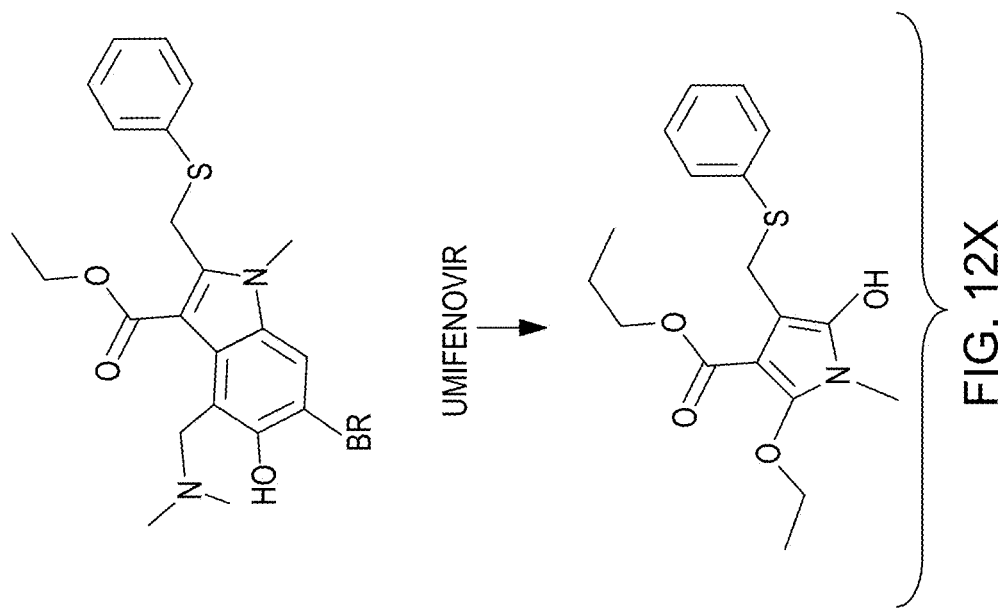
Figure 12W:
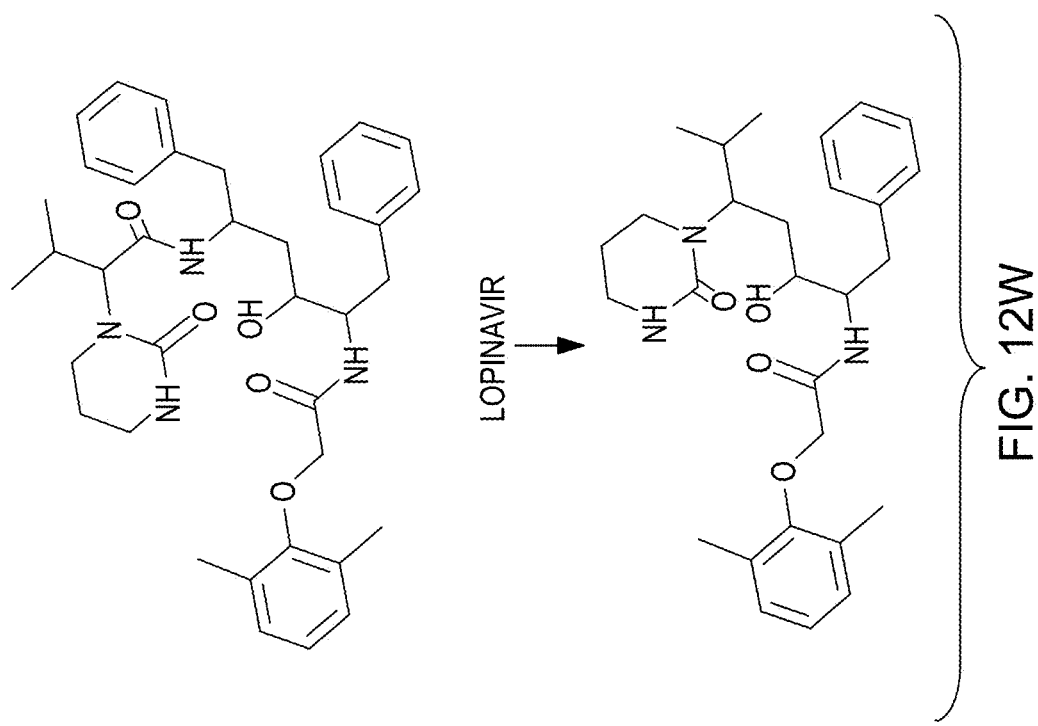

An extended validation analysis for the above-described SARS-CoV-2 use case is now provided in view of FIGS. 12A-12X which show both the original and QMO improved versions of all 24 COVID-19 drug candidates. In particular, FIGS. 12A-12X depicts the specific results of QMO optimization of existing drug molecules for COVID-19. Such as shown in FIG. 12A, and in each pair shown in each respective FIG. 12A-12X, the top row shows the 2D structure 800 of the original molecules and the bottom row shows the 2D structure of the QMO-optimized molecules 850 which started with the initial state above with the original drug name in-between.

FIG. 13 shows a Table 875 having a column 880 including the SMILES representations of these same original molecules (COVID-19 drug candidate compounds) labeled (A), (B), . . . , (X) in column 877 that correspond to the molecule pairs depicted in respective FIGS. 12A-12X. Additionally shown in column 885 are the SMILES representations of the QMO improved versions that correspond to the molecule pairs depicted in respective FIGS. 12A-12X.

FIG. 14 shows a Table 900 having a column 905 including the extended results of docking analysis on the COVID-19 drug candidates labeled (A), (B), . . . , (X) in column 877 that correspond to the molecule pairs depicted in respective FIGS. 12A-12X. Shown in column 905 are the Docking Energy predicted for the original molecules and their improved versions for all of the molecules depicted in FIGS. 12A-12X. As noted, since there is no established one-to-one correlation between predicted pIC50 and binding free energy from docking, a binary (favorable/not favorable) threshold of −6 kcal/mol binding free energy is used. In addition, it was investigated if the top binding modes revealed in docking do correspond to any of binding pockets reported, which were estimated using PrankWeb (at http://prankweb.cz/) and indexed by score. If the pocket does not change between original and improved molecules, a similar mode of inhibition of the target can be expected which is desirable (in the cases where the experimentally validated binding pocket of the original drug is known, e.g. see FIG. 1A-1C).

Further included in table 900 is additional column 910 of the extended docking analysis indicating the closest binding pocket for the molecules depicted in FIGS. 12A-12X in column 877.

Figure 15:
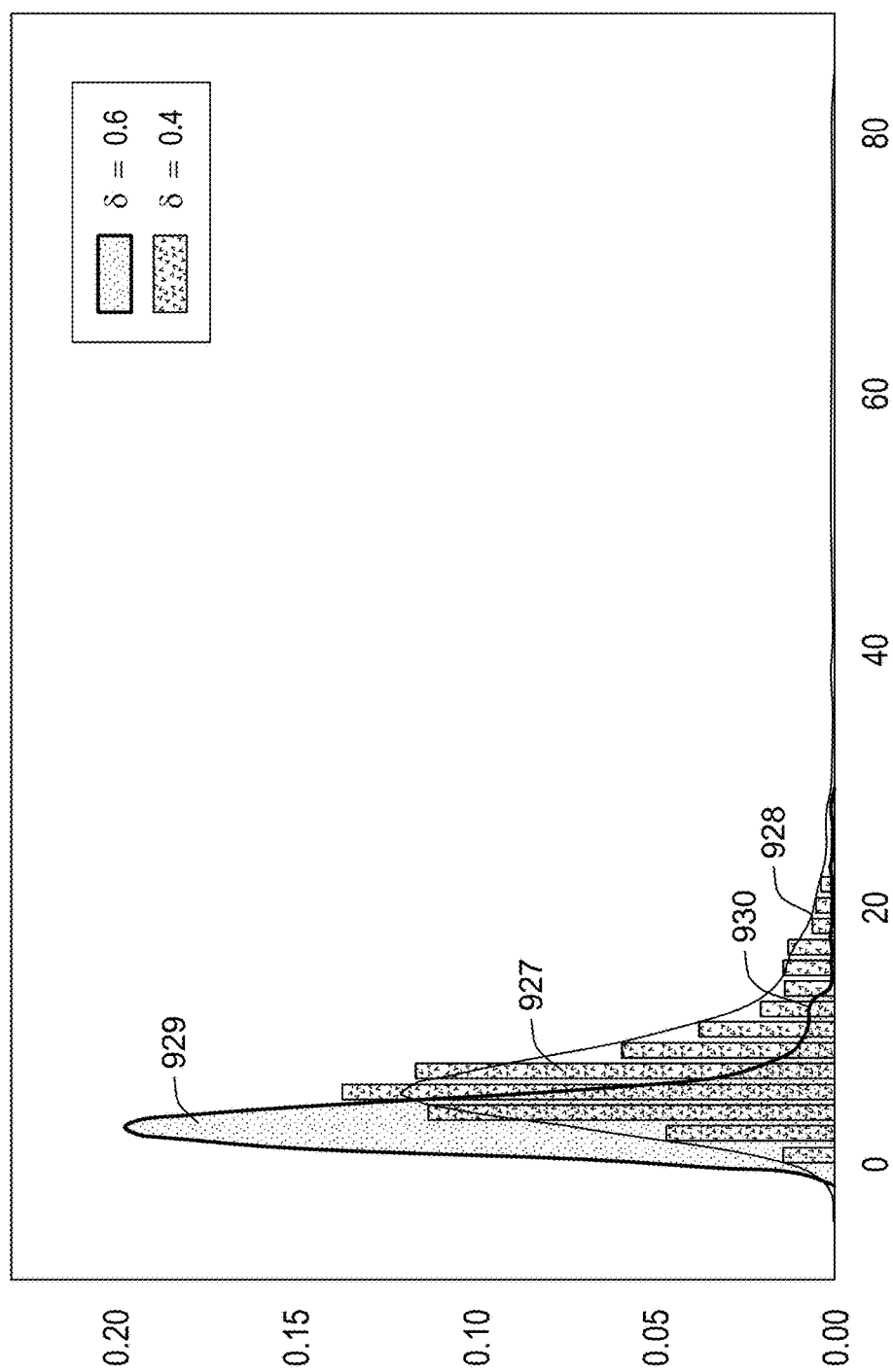
FIG. 15 shows two plots depicting the distribution of penalized log P values after optimization by QMO on an example molecule set for two different similarity constraint values $\delta$.

FIG. 15 shows a plot 925 of the distributions of penalized log P scores for the two similarity thresholds with the first distribution 927 for similarity threshold δ=0.4 and the second distribution 929 for similarity threshold δ=0.6 from description of the penalized log P benchmarks values after optimization by QMO on the 800 low-penalized log P molecule set. Each of the result distributions 927, 929 show a respective long tail 928, 930 on the right-hand side, increasing the variance.

Antimicrobial Peptide Use Case

In an additional use-case, the labeled part of a large curated antimicrobial peptide (AMP) database was used in a recent AI-empowered antimicrobial discovery study. The AMP dataset has several attributes associated with peptides from which was used antimicrobial (AMP) and toxicity. The labeled dataset has only linear and monomeric sequences with no terminal modification and length up to 50 amino acids. The dataset contains 8683 AMP and 6536 non-AMP; and 3149 toxic and 16280 non-toxic sequences. For the starting AMP sequences, there was considered sequences with up to length 15 and with property being both AMP and toxic. Then sequences were filtered for which the toxicity classifier predictions match with ground truth and 167 sequences were obtained.

Antimicrobial Peptide Optimization

With respect to the optimization of AMPs for improved toxicity, when using the BLAST package to compute the E-value, it is noted that in some cases it is unable to return a valid numerical value, which can occur if the sequence length is small. In the QMO optimization of AMPs, there is still taken an optimized sequence into consideration when its E-value computation is unavailable. This is viewed as a limitation of the E-value computation. To alleviate this issue of not finding a numeric E-value and to demonstrate that QMO can continue to optimize the similarity score after first success, the E-value is replaced with the latent distance $\|z-z_0\|_2^2$ (Euclidean distance) for AMP optimization, where $z_0=\text{Enc}(x_0)$ and $z=\text{Enc}(x)$. Lower latent distance suggests that the optimized sequence x is more similar to the original sequence $x_0$. It has been shown that the latent distance is a good similarity indicator, at least in the local neighborhood, as it is highly correlated with evolutionary similarity.

Figure 16A:
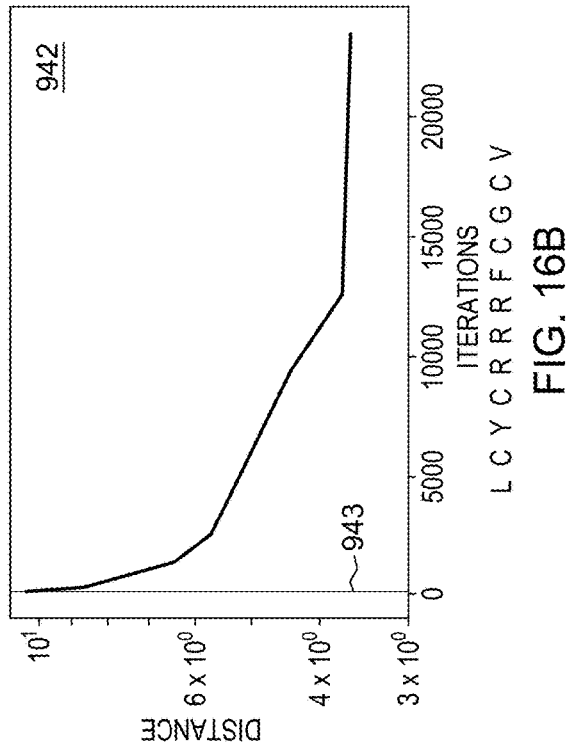
FIGS. 16A-16C show respective plots depicting the latent distances improvement of successful QMO optimization runs for three initial peptide sequences and depicting respective improvement between the original and optimized sequences as the method continues past the first success.
Figure 16B:
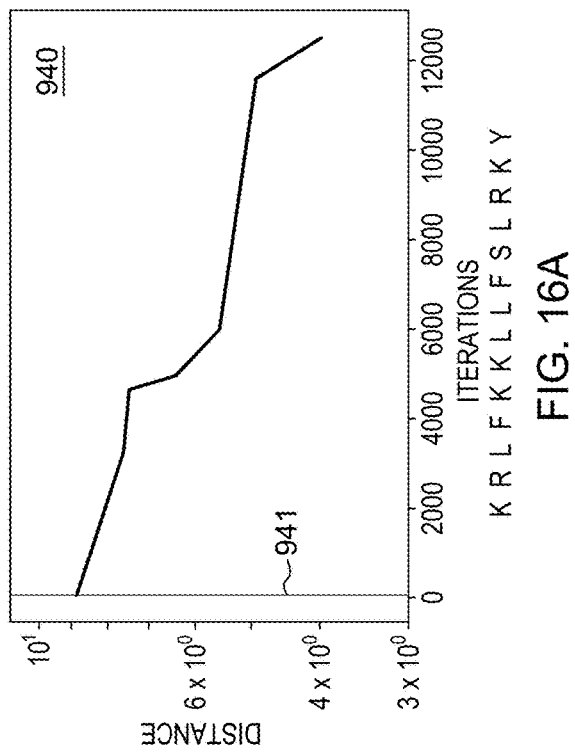
Figure 16C:
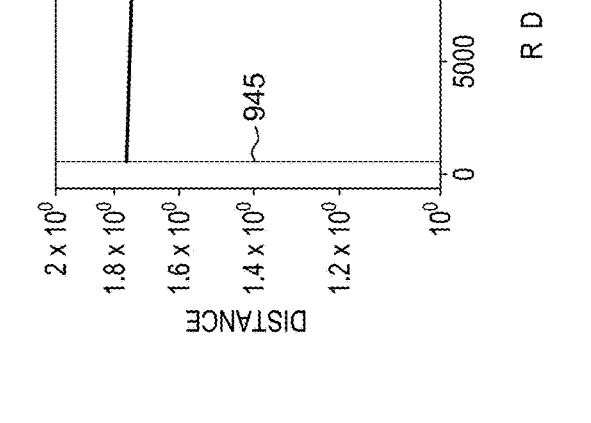

FIGS. 16A-16C show the latent distances improvement of successful QMO optimization runs for three initial peptide sequences and particularly depicts respective improvement between the original and optimized sequences as the method continues past the first success. For these experiments parameters used were Q=10, β=1, $\alpha c_0=\{0.1, 0.5\}$, $\gamma_{dist}=0.1$, and T=25000. As shown, each of respective FIGS. 16A-16C depict a respective plot 940, 942 and 944 of the Latent distance (y-axis) of successful optimization runs for three initial peptide sequences as plotted against the number of iterations (x-axis) shown on a log scale. The initial peptide sequences (i.e., K R L F K K L L F S L R K Y; L C Y C R R R F C G C V; R D V C R N F M R R) are shown below each respective plot 940, 942 and 944. The respective lines 941, 943 and 945 depicted in each respective plot 940, 942 and 944 indicate the iteration of the first success (i.e., first time finding a qualified molecule).

Stability Analysis—QED Optimization

Figure 17B:
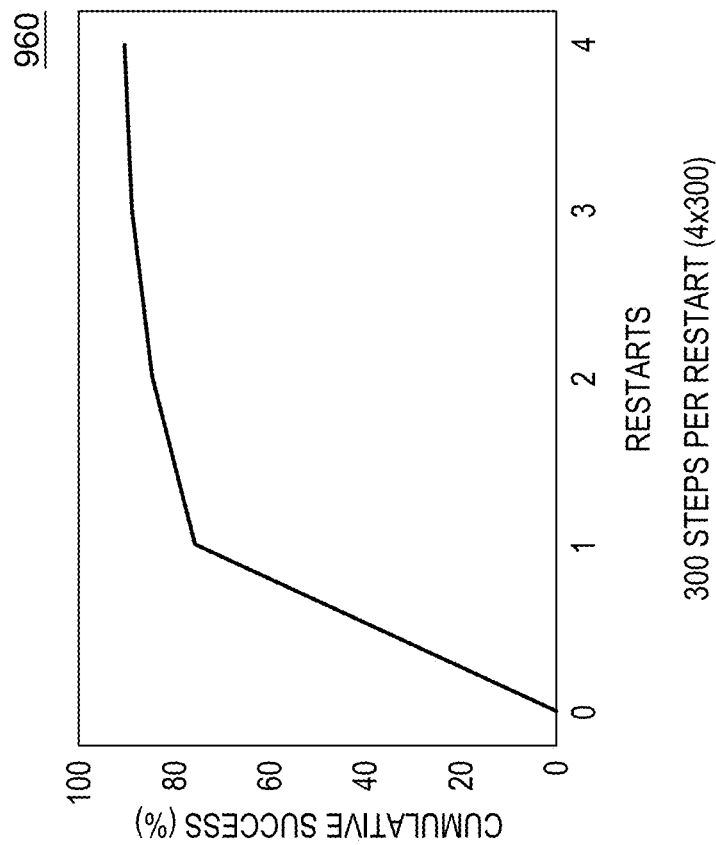
Figure 17A:
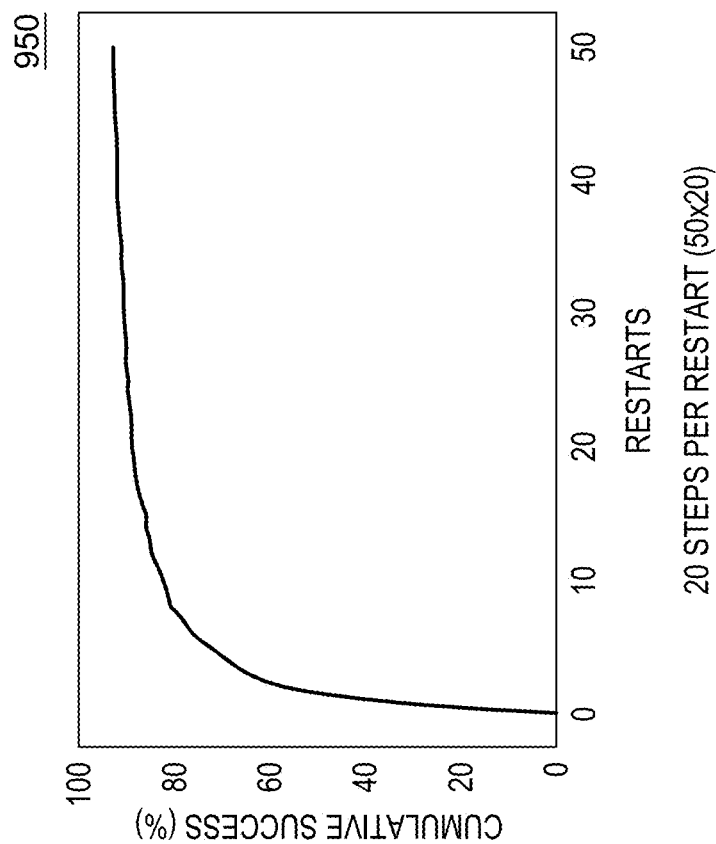

The total runtime for the QED task with T=20 iterations and 50 random restarts was approximately 487 CPU/GPU hours or, spread over 32 cores, 15.2 hours of wall time. In the demonstration, 15 random restarts were completed at a success rate of 85.9% in roughly 8 hours of wall time for 32 cores. All experiments were run on machines with Intel Xeon E5-2600 CPUs and NVIDIA K80 GPUs. FIGS. 17A, 17B depict respective plots 950, 960 illustrating the cumulative success (Y-axis) effect of multiple restarts (x-axis) for two example configurations running QMO on the QED task. Restarts happen if the algorithm is unable to find a successful candidate after the allotted number of steps. For this task, the algorithm stops after the first successful candidate is found. As shown in FIG. 17A, after 50 restarts at 20 steps, a success rate of 92.8% was reached whereas after 4 restarts at 300 steps as shown in FIG. 17B, only 90.9% success was achieved despite taking about as long—447 hours (4×300) compared to 487 hours (50×20). It is concluded that for relatively easy tasks (single-constraint optimization) using a small number of steps T, restarting with a new random seed can be very effective since at early iterations the (effective) step size is relatively large and the guided search may tend to overshoot.

The query-based molecule optimization framework system and methods described herein can be used to provide a timely solution for mitigating urgent crises such as pandemic coronaviruses.

Figure 18:
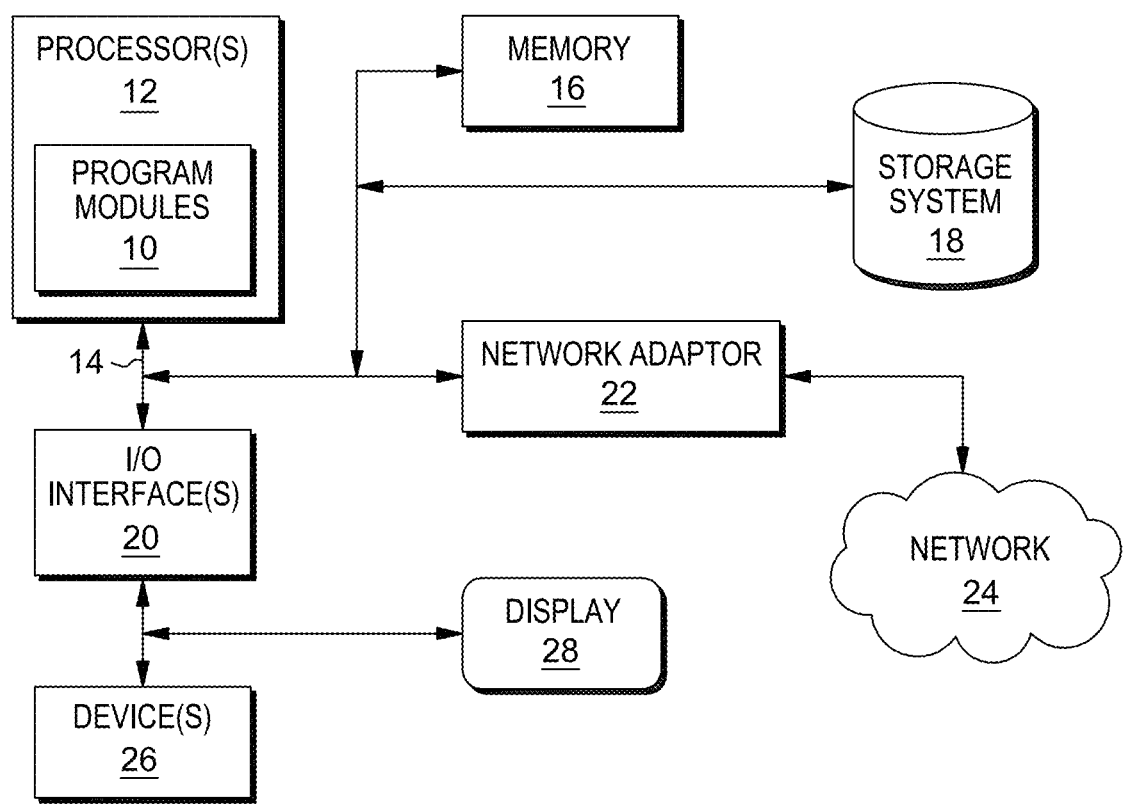
FIG. 18 illustrates yet another exemplary system in accordance with the present invention.

FIG. 18 illustrates an example computing system in accordance with the present invention. It is to be understood that the computer system depicted is only one example of a suitable processing system and is not intended to suggest any limitation as to the scope of use or functionality of embodiments of the present invention. For example, the system shown may be operational with numerous other general-purpose or special-purpose computing system environments or configurations. Examples of well-known computing systems, environments, and/or configurations that may be suitable for use with the system shown in FIG. 18 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

In some embodiments, the computer system may be described in the general context of computer system executable instructions, embodied as program modules stored in memory 16, being executed by the computer system. Generally, program modules may include routines, programs, objects, components, logic, data structures, and so on that perform particular tasks and/or implement particular input data and/or data types in accordance with the present invention (see e.g., FIG. 2).

The components of the computer system may include, but are not limited to, one or more processors or processing units 12, a memory 16, and a bus 14 that operably couples various system components, including memory 16 to processor 12. In some embodiments, the processor 12 may execute one or more modules 10 that are loaded from memory 16, where the program module(s) embody software (program instructions) that cause the processor to perform one or more method embodiments of the present invention. In some embodiments, module 10 may be programmed into the integrated circuits of the processor 12, loaded from memory 16, storage device 18, network 24 and/or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system may include a variety of computer system readable media. Such media may be any available media that is accessible by computer system, and it may include both volatile and non-volatile media, removable and non-removable media.

Memory 16 (sometimes referred to as system memory) can include computer readable media in the form of volatile memory, such as random access memory (RAM), cache memory an/or other forms. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

The computer system may also communicate with one or more external devices 26 such as a keyboard, a pointing device, a display 28, etc.; one or more devices that enable a user to interact with the computer system; and/or any devices (e.g., network card, modem, etc.) that enable the computer system to communicate with one or more other computing devices. Such communication can occur via Input/Output (I/O) interfaces 20.

Still yet, the computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with the computer system. Examples include, but are not limited to: microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The corresponding structures, materials, acts, and equivalents of all elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. An end-to-end query-based molecule optimization method comprising:

receiving, at a pre-trained plug-in encoder-decoder model running on at least one hardware processor of a computer system, a 1-dimensional string representation of an original molecule having a plurality of properties to be optimized;

encoding, using the trained plug-in encoder-decoder model running on the at least one hardware processor, the 1-dimensional string representation of the original molecule to be optimized into a latent vector representation of a latent vector space of the trained encoder-decoder model;

modifying, by the at least one hardware processor, the latent vector representation in the latent vector space;

decoding, by the trained plug-in encoder-decoder model running on the at least one hardware processor, the latent vector representation to obtain a decoded candidate molecule sequence structure;

inputting, by the at least one hardware processor, the decoded candidate molecule sequence structure to each of a plurality of independent, pre-trained machine learned molecular property prediction models, the plug-in encoder-decoder model being detached from the plurality of independent, pre-trained, machine-learned property prediction modules, and running, by the at least one hardware processor, the plurality of machine learned molecular property prediction models to predict for said decoded candidate molecule sequence structure a respective plurality of molecular properties used to evaluate the candidate molecule sequence structure;

obtaining, using the at least one hardware processor, a loss function using a combination of the multiple molecular property predictions, said one or more said respective plurality of molecular property predictions for optimizing molecular properties of said original molecule while satisfying one or more constraints, the obtained loss function comprising: a first function term quantifying a molecular constraint loss to be minimized and a second function term quantifying a molecular property score to be maximized;

performing a pseudo-gradient estimation of said loss function using the at least one hardware processor, said pseudo-gradient estimation comprising a zeroth-order optimization over the latent representation vector space of the trained encoder-decoder model that includes iteratively modifying the latent vector by applying one or more random direction queries using said random vector from said latent representation vector space and obtaining, at each iteration, a pseudo-gradient estimation of the loss function and generating corresponding loss values as a measure of differences between respective plurality of molecular property predictions and a corresponding respective plurality of specified threshold constraints, and using the generated loss values at each iteration to determine a direction in the latent space for further modifying said latent vector in said latent representation vector space to achieve improved predicted molecular properties;

determining by the at least one hardware processor when said each of the plurality of properties predicted for said corresponding further modified latent vector representation or its corresponding decoded candidate molecule sequence structure satisfy all said corresponding respective plurality of the specified threshold constraints; and outputting to a manufacturing pipeline, by the at least one hardware processor, the corresponding further modified sequence structure as an optimized original molecule to be manufactured when each of the plurality of properties predicted for said further modified sequence structure satisfies all said respective plurality of the specified threshold constraints, wherein the end-to-end query-based molecule optimization is model-agnostic as to how molecule representations are learned and trained.

2. The method as claimed in claim 1, wherein a sequence structure of said original molecule to be optimized is a 1-dimensional sequence of symbols, said method further comprising:

encoding, by the at least one hardware processor, the 1-dimensional sequence of symbols by mapping said 1-dimensional sequence of symbols to a data vector in the latent representation vector space, said data vector comprising a latent representation of the 1-dimensional sequence of symbols at a latent dimension.

3. The method as claimed in claim 2, wherein said modifying said latent vector representation comprises:

adding a perturbation to said data vector to obtain a modified data vector, said perturbation comprising a random vector;

said method further comprising:
decoding said modified data vector to obtain a new modified sequence structure corresponding to the original molecule for said evaluation of the respective plurality of predicted properties.

4. The method as claimed in claim 1, wherein said loss function is formulated to:

optimize a molecular similarity to said original molecule while satisfying desired chemical properties, said loss function comprising: a first function term quantifying a property validity loss to be minimized and a second function term quantifying a molecular similarity score to be maximized.

5. The method as claimed in claim 3, wherein said loss function is an objective function to be minimized, said method comprises:

performing a zeroth order gradient descent method to solve said objective function; and obtaining a generated loss value from solving said objective function.

6. The method as claimed in claim 5, further comprising: updating an iterate of said objective function as a function of the generated loss value of a current iteration.

7. A non-transitory computer readable medium comprising instructions that, when executed by at least one hardware processor, configure the at least one hardware processor to:

receive, at a pre-trained plug-in encoder-decoder model running on the least one hardware processor, a 1-dimensional string representation of an original molecule having a plurality of properties to be optimized;

encode, using the trained plug-in encoder-decoder model, the 1-dimensional string representation of the original molecule to be optimized into a latent vector representation of a latent vector space of the trained encoder-decoder model;

modify the latent vector representation in the latent vector space;

decode, by the trained plug-in encoder-decoder model, the latent vector representation in the latent vector space to obtain a decoded candidate molecule sequence structure;

input the decoded candidate molecule sequence structure to each of a plurality of machine learned molecular property prediction models, the plug-in encoder-decoder model being detached from the plurality of independent, pre-trained, machine-learned property prediction modules, and run the plurality of machine learned molecular property prediction models to predict for said decoded candidate molecule sequence structure a respective plurality of molecular properties used to evaluate the candidate molecule sequence structure;

obtain a loss function using a combination of the multiple molecular property predictions, said one or more said respective plurality of molecular property predictions for optimizing molecular properties of said original molecule while satisfying one or more constraints, the obtained loss function comprising: a first function term quantifying a molecular constraint loss to be minimized and a second function term quantifying a molecular property score to be maximized;

perform a pseudo-gradient estimation of said loss function, said pseudo-gradient estimation comprising a zeroth-order optimization over the latent representation vector space of the trained encoder-decoder model that includes iteratively modifying the latent vector by applying one or more random direction queries using said random vector from said latent representation vector space and obtain, at each iteration, a pseudo-gradient estimation of the loss function and generate corresponding loss values as a measure of differences between a respective plurality of molecular property predictions and a corresponding respective plurality of specified threshold constraints, and use the generated loss values at each iteration to determine a direction in the latent space for further modifying said latent vector representation in said latent vector space to achieve improved predicted properties of the original molecule to be optimized; and determine when said each of the plurality of properties predicted for the corresponding further modified latent vector representation or its corresponding decoded candidate molecule sequence structure satisfy all said corresponding respective plurality of the specified threshold constraints; and output to a manufacturing pipeline the corresponding further modified sequence structure as an optimized original molecule to be manufactured when each of the plurality of properties predicted for said further modified sequence structure satisfies all said respective plurality of the specified threshold constraints, wherein an end-to-end query-based molecule optimization is provided that is model-agnostic as to how the molecule representations are learned and trained.

8. The non-transitory computer readable medium as claimed in claim 7, wherein a sequence structure of said original molecule to be optimized is a 1-dimensional sequence of symbols, said instructions further configure the at least one hardware processor to:

encode the 1-dimensional sequence of symbols by mapping said 1-dimensional sequence of symbols to a data vector in the latent representation vector space, said data vector comprising a latent representation of the 1-dimensional sequence of symbols at a latent dimension.

9. The non-transitory computer readable medium as claimed in claim 8, wherein to modify said latent vector representation, said instructions further configure the at least one hardware processor to:

add a perturbation to said data vector to obtain a modified data vector, said perturbation comprising a random vector; and said instructions further configuring the at least one hardware processor to:

decode said modified data vector to obtain a new modified sequence structure corresponding to the original molecule for said evaluation of the respective plurality of predicted properties.

10. The non-transitory computer readable medium as claimed in claim 7, wherein said loss function is formulated to:

optimize a molecular similarity to said original molecule while satisfying desired chemical properties, said loss function comprising: a first function term quantifying a property validity loss to be minimized and a second function term quantifying a molecular similarity score to be maximized.

11. The non-transitory computer readable medium as claimed in claim 9, wherein the loss function is an objective function to be minimized, the instructions further configure the at least one hardware processor to:

perform a zeroth order gradient descent method to solve said objective function; and obtain a generated loss value from solving said objective function.

12. The non-transitory computer readable medium as claimed in claim 11, wherein the instructions further configure the at least one hardware processor to:

update an iterate of said objective function as a function of the generated loss value of a current iteration.

13. An end-to-end computer-implemented query-based molecule optimization system comprising:

a memory storage device; and a hardware processor coupled to said memory storage device and configured to perform a method to:

receive, at a pre-trained plug-in encoder-decoder model running on the least one hardware processor, a 1-dimensional string representation of an original molecule having a plurality of properties to be optimized;

encode, using the trained plug-in encoder-decoder model, the 1-dimensional string representation of the original molecule to be optimized into a latent vector representation of a latent vector space of the trained encoder-decoder model;

modify the latent vector representation in the latent vector space;

decode, by the trained plug-in encoder-decoder model, the latent vector representation in the latent vector space to obtain a decoded candidate molecule sequence structure;

input the decoded candidate molecule sequence structure to each of a plurality of independent, pre-trained machine learned molecular property prediction models, the plug-in encoder-decoder model being detached from the plurality of independent, pre-trained, machine-learned property prediction modules, and run the plurality of machine learned molecular property prediction models to predict for said decoded candidate molecule sequence structure a respective plurality of molecular properties used to evaluate the candidate molecule sequence structure;

obtain a loss function using a combination of the multiple molecular property predictions, said one or more said respective plurality of molecular property predictions for optimizing molecular properties of said original molecule while satisfying one or more constraints, the obtained loss function comprising: a first function term quantifying a molecular constraint loss to be minimized and a second function term quantifying a molecular property score to be maximized;

perform a pseudo-gradient estimation of said loss function, said pseudo-gradient estimation comprising a zeroth-order optimization over the latent representation vector space of the trained encoder-decoder model that includes iteratively modifying the latent vector by applying one or more random direction queries using said random vector from said latent representation vector space and obtain, at each iteration, a pseudo-gradient estimation of the loss function and generate corresponding loss values as a measure of differences between a respective plurality of molecular property predictions and a corresponding respective plurality of specified threshold constraints, and use the generated loss values at each iteration to determine a direction in the latent space for further modifying said latent vector representation in said latent vector space to achieve improved predicted properties of the original molecule to be optimized;

determine when said each of the plurality of properties predicted for the corresponding further modified latent vector representation or its corresponding decoded candidate molecule sequence structure satisfy all said corresponding respective plurality of the specified threshold constraints; and output to a manufacturing pipeline the corresponding further modified sequence structure as an optimized original molecule to be manufactured when each of the plurality of properties predicted for said further modified sequence structure satisfies all said respective plurality of the specified threshold constraints, wherein the end-to-end query-based molecule optimization is model-agnostic as to how molecule representations are learned and trained.

14. The computer-implemented system as claimed in claim 13, wherein a sequence structure of said original molecule to be optimized is a 1-dimensional sequence of symbols, said hardware processor further configured to:

encode the 1-dimensional sequence of symbols by mapping said 1-dimensional sequence of symbols to a data vector in the latent representation vector space, said data vector comprising a latent representation of the 1-dimensional sequence of symbols at a latent dimension.

15. The computer-implemented system as claimed in claim 14, wherein said modifying said latent vector representation comprises:
   adding a perturbation to said data vector to obtain a modified data vector, said perturbation comprising a random vector; and
   said hardware processor is further configured to:
      decode said further modified data vector to obtain a new modified sequence structure corresponding to the original molecule for said evaluation of the respective plurality of predicted properties.

16. The computer-implemented system as claimed in claim 15, wherein said loss function is formulated to:
   optimize a molecular similarity to said original molecule while satisfying desired chemical properties, said loss function comprising: a first function term quantifying a property validity loss to be minimized and a second function term quantifying a molecular similarity score to be maximized.

17. The computer-implemented system as claimed in claim 16, wherein the loss function is an objective function to be minimized, the hardware processor is further configured to:
   perform a zeroth order gradient descent method to solve said objective function; and
   obtain a generated loss value from solving said objective function.

18. The computer-implemented system as claimed in claim 17, wherein the hardware processor is further configured to:
   update an iterate of said objective function as a function of the generated loss value of a current iteration.

* * * * *